US009069600B2

(12) United States Patent
Schmidt et al.

(10) Patent No.: US 9,069,600 B2
(45) Date of Patent: Jun. 30, 2015

(54) EXECUTING A MULTICOMPONENT SOFTWARE APPLICATION ON A VIRTUALIZED COMPUTER PLATFORM

(75) Inventors: Rene W. Schmidt, Risskov (DK); Karl E. Rumelhart, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/618,510

(22) Filed: Sep. 14, 2012

(65) Prior Publication Data

US 2013/0019243 A1 Jan. 17, 2013

Related U.S. Application Data

(63) Continuation of application No. 11/405,806, filed on Apr. 17, 2006, now Pat. No. 8,286,174.

(51) Int. Cl.

*G06F 9/455* (2006.01)
*G06F 9/46* (2006.01)
*G06F 15/173* (2006.01)
*G06F 9/50* (2006.01)
*G06F 9/48* (2006.01)
*G06F 9/445* (2006.01)

(52) U.S. Cl.

CPC .......... *G06F 9/45558* (2013.01); *G06F 9/4856* (2013.01); *G06F 2009/4557* (2013.01); *G06F 9/5077* (2013.01); *G06F 9/44505* (2013.01); *G06F 2009/45562* (2013.01)

(58) Field of Classification Search

None

See application file for complete search history.

(56) References Cited

U.S. PATENT DOCUMENTS

| | | | | |
|---|---|---|---|---|
| 5,063,500 | A | 11/1991 | Shorter | |
| 6,223,202 | B1 * | 4/2001 | Bayeh | 718/102 |
| 7,203,944 | B1 | 4/2007 | van Rietschote et al. | |
| 7,222,062 | B2 | 5/2007 | Goud et al. | |
| 7,356,817 | B1 | 4/2008 | Cota-Robles et al. | |
| 7,415,704 | B2 | 8/2008 | Schmidt et al. | |
| 7,546,607 | B2 | 6/2009 | Demsey et al. | |
| 7,577,722 | B1 | 8/2009 | Khandekar et al. | |
| 7,577,959 | B2 * | 8/2009 | Nguyen et al. | 718/105 |
| 7,603,671 | B2 | 10/2009 | Liu | |
| 7,607,129 | B2 * | 10/2009 | Rosu et al. | 718/1 |
| 7,716,667 | B2 | 5/2010 | van Rietschote et al. | |

(Continued)

OTHER PUBLICATIONS

Xuxian Jiang; SODA: a Service-On-Demand Architecture for Application Service Hosting Utility Platforms; IEEE 2003; 10 pages.*

*Primary Examiner* — Abdullah Al Kawsar

(57) ABSTRACT

A virtualized computer platform is established and maintained by virtualization software on one or more physical computers. A multicomponent software application may execute on the virtualized computer platform, with different components of the application executing in different virtual machines, which are supported by the virtualization software. The virtualization software may also provide the provision of one or more services that may be beneficial to the operation of the multicomponent software application, such as automated provisioning, resource allocation, VM distribution, performance monitoring, resource management, high availability, backup, disaster recovery, alarms, security, etc. In some embodiments of the invention, some of these services are provided through coordinated efforts of a system resource manager, a VM manager, an application monitor and an application resource manager. In some of these embodiments, an application monitor and an application manager may be included with a multicomponent software application in a single installation package.

19 Claims, 6 Drawing Sheets

(56) References Cited

U.S. PATENT DOCUMENTS

| | | | | |
|---|---|---|---|---|
| 7,721,292 | B2 | 5/2010 | Frasier et al. | |
| 7,721,330 | B1 | 5/2010 | Nachenberg et al. | |
| 7,861,247 | B1 * | 12/2010 | Santos et al. | 718/104 |
| 8,181,182 | B1 * | 5/2012 | Martin | 718/104 |
| 2003/0088604 | A1 | 5/2003 | Kuck et al. | |
| 2003/0187915 | A1 | 10/2003 | Sun et al. | |
| 2004/0128670 | A1 | 7/2004 | Robinson et al. | |
| 2005/0039183 | A1 * | 2/2005 | Romero et al. | 718/100 |
| 2005/0050106 | A1 | 3/2005 | Wenner et al. | |
| 2005/0228852 | A1 * | 10/2005 | Santos et al. | 709/200 |
| 2006/0070067 | A1 | 3/2006 | Lowery | |
| 2006/0195715 | A1 * | 8/2006 | Herington | 714/4 |
| 2006/0271395 | A1 | 11/2006 | Harris et al. | |
| 2007/0028237 | A1 | 2/2007 | Bulson et al. | |
| 2007/0226736 | A1 | 9/2007 | Johnson et al. | |
| 2007/0240160 | A1 | 10/2007 | Paterson-Jones et al. | |
| 2009/0193414 | A1 | 7/2009 | Broussard et al. | |
| 2012/0124576 | A1 * | 5/2012 | Chiaramonte et al. | 718/1 |

* cited by examiner

EXECUTING A MULTICOMPONENT SOFTWARE APPLICATION ON A VIRTUALIZED COMPUTER PLATFORM

FIELD OF THE INVENTION

This application is a continuation of and claims priority from U.S. application Ser. No. 11/405,806, which was filed Apr. 17, 2006, entitled "Executing a Multicomponent Software Application on a Virtualized Computer Platform," now U.S. Pat. No. 8,286,174.

DESCRIPTION OF THE RELATED ART

The invention may be implemented as one or more computer programs or as one or more computer program modules embodied in one or more computer readable media. The computer readable media may be based on any existing or subsequently developed technology for embodying computer programs in a manner that enables them to be read by a computer. For example, the computer readable media may comprise one or more CDs (Compact Discs), one or more DVDs (Digital Versatile Discs), some form of flash memory device, a computer hard disk and/or some form of internal computer memory, to name just a few examples. An embodiment of the invention, in which one or more computer program modules is embodied in one or more computer readable media, may be made by writing the computer program modules to any combination of one or more computer readable media. Such an embodiment of the invention may be sold by enabling a customer to obtain a copy of the computer program modules in one or more computer readable media, regardless of the manner in which the customer obtains the copy of the computer program modules. Thus, for example, a computer program implementing the invention may be purchased electronically over the Internet and downloaded directly from a vendor's web server to the purchaser's computer, without any transference of any computer readable media. In such a case, writing the computer program to a hard disk of the web server to make it available over the Internet may be considered a making of the invention on the part of the vendor, and the purchase and download of the computer program by a customer may be considered a sale of the invention by the vendor, as well as a making of the invention by the customer.

The invention generally relates to providing a virtualized computer platform for the execution of software applications that comprise multiple software components that are generally executed concurrently. For example, the virtualized computer platform may be advantageously used for the execution of distributed applications and/or multitier applications. For purposes of this patent, a conventional software application that comprises multiple software modules that are linked together to form a single program, so that generally only one software module is executing at a time, does not constitute a multicomponent software application (or a software application comprising multiple software components). Conversely, for purposes of this patent, a "multicomponent software application" means a collection of multiple software components, a plurality of which is generally executed concurrently, in a coordinated manner. In particular, for purposes of this patent, a multicomponent software application means a distributed application, a multitier application, or a substantially similar software application comprising multiple software components. However, in some embodiments of the invention, the virtualized computer platform can also be used for the execution of conventional software applications that do not comprise multiple software components. A preferred embodiment of the invention may be derived from existing virtualization products of the assignee of this patent, VMware, Inc. Consequently, the general architectures of two types of products of VMware, a "hosted" virtual computer system and a "kernel-based" virtual computer system, are described below to provide background for the detailed description of the invention. The invention may also be implemented in a wide variety of other virtualized computer systems, however.

Hosted Virtual Computer System

FIG. 1 illustrates the main components of a "hosted" virtual computer system 100A as generally implemented in the Workstation virtualization product of VMware, Inc. The virtual computer system 100A supports a virtual machine (VM) 300A. As is well known in the field of computer science, a VM is a software abstraction or a "virtualization," often of an actual physical computer system. As in conventional computer systems, both system hardware 102 and system software 150 are included. The system hardware 102 includes one or more processors (CPUs) 104, which may be a single processor, or two or more cooperating processors in a known multiprocessor arrangement. The system hardware also includes system memory 108, one or more disks 110, and some form of memory management unit (MMU) 106. The system memory is typically some form of high-speed RAM (random access memory), whereas the disk is typically a non-volatile, mass storage device. As is well understood in the field of computer engineering, the system hardware also includes, or is connected to, conventional registers, interrupt-handling circuitry, a clock, etc., which, for the sake of simplicity, are not shown in the figure.

The system software 150 typically either is or at least includes an operating system (OS) 152, which has drivers 154 as needed for controlling and communicating with various devices 112, and usually with the disk 110 as well. Conventional applications 160 (APPS), if included, may be installed to run on the hardware 102 via the system software 150 and any drivers needed to enable communication with devices.

The VM 300A—also known as a "virtual computer"—is often a software implementation of a complete computer system. In the VM, the physical system components of a "real" computer are emulated in software, that is, they are virtualized. Thus, the VM 300A will typically include virtualized ("guest") system hardware 302, which in turn includes one or more virtual CPUs 304 (VCPU), virtual system memory 308 (VMEM), one or more virtual disks 310 (VDISK), and one or more virtual devices 312 (VDEVICE), all of which are implemented in software to emulate the corresponding components of an actual computer. The concept, design and operation of virtual machines are well known in the field of computer science.

The VM 300A also has system software 350, which may include a guest OS 352, as well as drivers 354 as needed, for example, to control the virtual device(s) 312. The guest OS 352 may, but need not, simply be a copy of a conventional, commodity OS. Of course, most computers are intended to run various applications, and a VM is usually no exception. Consequently, by way of example, FIG. 1 illustrates one or more applications 360 (APPS) installed to run on the guest OS 352; any number of applications, including none at all, may be loaded for running on the guest OS, limited only by the requirements of the VM. Software running in the VM 300A, including the guest OS 352 and the guest applications 360, is generally referred to as "guest software."

Note that although the virtual hardware "layer" 302 is a software abstraction of physical components, the VM's system software 350 may be the same as would be loaded into a hardware computer. The modifier "guest" is used here to indicate that the VM, although it acts as a "real" computer from the perspective of a user, is actually just computer code that is executed on the underlying "host" hardware and software platform 102, 150. Thus, for example, I/O to a virtual device 312 will actually be carried out by I/O to a corresponding hardware device 112, but in a manner transparent to the VM.

Some interface is usually required between the VM 300A and the underlying "host" hardware 102, which is responsible for actually executing VM-related instructions and transferring data to and from the actual physical memory 108, the processor(s) 104, the disk(s) 110 and the other device(s) 112. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 34-45.

A VMM is usually a relatively thin layer of software that runs directly on top of host software, such as the system software 150, or directly on the hardware, and virtualizes the resources of the (or some) hardware platform. FIG. 1 shows virtualization software 200A running directly on the system hardware 102. The virtualization software 200A may be a VMM, for example. Thus, the virtualization software 200A is also referred to herein as a VMM 200A. The VMM 200A will typically include at least one device emulator 252A, which may also form the implementation of the virtual device 312. The VMM 200A may also include a memory manager 254A that maps memory addresses used within the VM 300A (for the virtual memory 308) to appropriate memory addresses that can be applied to the physical memory 108. The VMM also usually tracks and either forwards (to the host OS 152) or itself schedules and handles all requests by its VM for machine resources, as well as various faults and interrupts. FIG. 1 therefore illustrates an interrupt (including fault) handler 256A within the VMM. The general features of VMMs are well known and are therefore not discussed in further detail here.

FIG. 1 illustrates a single VM 300A merely for the sake of simplicity; in many installations, there will be more than one VM installed to run on the common hardware platform; all may have essentially the same general structure, although the individual components need not be identical. Also in FIG. 1, a single VMM 200A is shown acting as the interface for the single VM 300A. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In all of these configurations, there must be some way for the VM to access hardware devices, albeit in a manner transparent to the VM itself. One solution would of course be to include in the VMM all the required drivers and functionality normally found in the host OS 152 to accomplish I/O tasks. Two disadvantages of this solution are increased VMM complexity and duplicated effort—if a new device is added, then its driver would need to be loaded into both the host OS and the VMM. A third disadvantage is that the use of a hardware device by a VMM driver may confuse the host OS, which typically would expect that only the host's driver would access the hardware device. A different method for enabling the VM to access hardware devices has been implemented by VMware, Inc., in its Workstation virtualization product. This method is also illustrated in FIG. 1.

In the system illustrated in FIG. 1, both the host OS 152 and the VMM 200A are installed at system level, meaning that they both run at the greatest privilege level and can therefore independently modify the state of the hardware processor(s). For I/O to at least some devices, however, the VMM may issue requests via the host OS. To make this possible, a special driver VMdrv 258 is installed as any other driver within the host OS 152 and exposes a standard API (Application Program Interface) to a user-level application VMapp 260. When the system is in the VMM context, meaning that the VMM is taking exceptions, handling interrupts, etc., but the VMM wishes to use the existing I/O facilities of the host OS, the VMM calls the driver VMdrv 258, which then issues calls to the application VMapp 260, which then carries out the I/O request by calling the appropriate routine in the host OS.

In FIG. 1, a vertical line 230 symbolizes the boundary between the virtualized (VM/VMM) and non-virtualized (host software) "worlds" or "contexts." The driver VMdrv 258 and application VMapp 260 thus enable communication between the worlds even though the virtualized world is essentially transparent to the host system software 150.

In some cases, however, it may be beneficial to deploy VMMs on top of a thin software layer, a "kernel," constructed specifically for this purpose. FIG. 2 illustrates an implementation in which a kernel 202B takes the place of and performs the conventional functions of the host OS, including handling actual I/O operations. The kernel-based virtual computer system of FIG. 2 is described in greater detail below. Compared with a system in which VMMs run directly on the hardware platform, use of a kernel offers greater modularity and facilitates provision of services that extend across multiple virtual machines (for example, resource management). Also, compared with the hosted deployment, a kernel may offer greater performance because it can be co-developed with the VMM and be optimized for the characteristics of a workload consisting of VMMs.

As used herein, the "host" OS therefore means either the native OS 152 of the underlying physical computer, a specially constructed kernel 202B as described below, or whatever other system-level software handles actual I/O operations, takes interrupts, etc. for the VM. The invention may be used in all the different configurations mentioned above.

Kernel-Based Virtual Computer System

FIG. 2 illustrates the main components of a "kernel-based" virtual computer system 100B as generally implemented in the ESX Server virtualization product of VMware, Inc. A kernel-based virtualization system of the type illustrated in FIG. 2 is described in U.S. patent application Ser. No. 09/877,378 ("Computer Configuration for Resource Management in Systems Including a Virtual Machine"), which is incorporated here by reference. The main components of this system and aspects of their interaction are, however, outlined below.

The virtual computer system 100B includes one or more VMs, such as a first VM 300B and a second VM 300C. Each VM is installed as a "guest" on a "host" hardware platform, which, as shown in FIG. 2, may be the same as the hardware platform 102 of the virtual computer system 100A of FIG. 1. Thus, FIG. 2 shows the hardware platform 102 as including the one or more processors (CPUs) 104, the system memory 108, one or more disks 110, the MMU 106, and the device(s) 112.

Each VM 300B, 300C may include the same virtualized ("guest") system hardware 302 as the VM 300A of FIG. 1. Thus, FIG. 2 shows the VM 300B as including the virtual system hardware 302, including the one or more virtual CPUs 304 (VCPU), the virtual system memory 308 (VMEM), the one or more virtual disks 310 (VDISK), and the one or more virtual devices 312 (VDEVICE). Each VM 300B, 300C may also include the guest OS 352, the drivers 354 and the one or more applications 360 (APPS) of the VM 300A of FIG. 1, as shown in FIG. 2 for the VM 300B.

Also as shown in FIG. 2, the virtual computer system 100B includes virtualization software 200B, which includes a VMM 250B that supports the VM 300B and a VMM 250C that supports the VM 300C. The VMMs 250B and 250C may be substantially the same as the virtualization software (VMM) 200A shown in FIG. 1. Thus, FIG. 2 shows the VMM 250B as including one or more device emulators 252B, which may be substantially the same as the device emulators 252A, a memory manager 254B, which may be substantially the same as the memory manager 254A, and an interrupt handler 256B, which may be substantially the same as the interrupt handler 256A.

The device emulators 252B emulate system resources for use within the VM 300B. These device emulators will then typically also handle any necessary conversions between the resources as exported to the VM and the actual physical resources. One advantage of such an arrangement is that the VMM 250B may be set up to expose "generic" devices, which facilitates VM migration and hardware platform-independence. For example, the VMM may be set up with a device emulator 252B that emulates a standard Small Computer System Interface (SCSI) disk, so that the virtual disk 310 appears within the VM 300B to be a standard SCSI disk connected to a standard SCSI adapter, whereas the underlying, actual, physical disk 110 may be something else. In this case, a standard SCSI driver is installed into the guest OS 352 as one of the drivers 354. The device emulator 252B then interfaces with the driver 354 and handles disk operations for the VM 300B. The device emulator 252B then converts the disk operations from the VM 300B to corresponding disk operations for the physical disk 110.

When the computer system 100B of FIG. 2 is booted up, an existing operating system 152, which may be the same as the host OS 152 of FIG. 1, may be at system level and the kernel 202B may not yet even be operational within the system. In such case, one of the functions of the OS 152 may be to make it possible to load the kernel 202B, after which the kernel runs on the native hardware 102 and manages system resources. In effect, the kernel, once loaded, displaces the OS 152. Thus, the kernel 202B may be viewed either as displacing the OS 152 from the system level and taking this place itself, or as residing at a "sub-system level." When interposed between the OS 152 and the hardware 102, the kernel 202B essentially turns the OS 152 into an "application," which has access to system resources only when allowed by the kernel 202B. The kernel then schedules the OS 152 as if it were any other component that needs to use system resources.

The OS 152 may also be included to allow applications unrelated to virtualization to run; for example, a system administrator may need such applications to monitor the hardware 102 or to perform other administrative routines. The OS 152 may thus be viewed as a "console" OS (COS). In such implementations, the kernel 202B preferably also includes a remote procedure call (RPC) mechanism to enable communication between, for example, the VMMs 250B, 250C and any applications 160 (APPS), which may be the same as the applications 160 of FIG. 1, installed to run on the COS 152.

The kernel 202B handles not only the various VMM/VMs, but also any other applications running on the kernel, as well as the COS 152 and even the hardware CPU(s) 104, as entities that can be separately scheduled. In this disclosure, each schedulable entity is referred to as a "world," which contains a thread of control, an address space, machine memory, and handles to the various device objects that it is accessing. Worlds are stored in a portion of the memory space controlled by the kernel. More specifically, the worlds are controlled by a world manager, represented in FIG. 2 within the kernel 202B as module 206B. Each world also has its own task structure, and usually also a data structure for storing the hardware state currently associated with the respective world.

There will usually be different types of worlds: 1) system worlds, which are used for idle worlds, one per CPU, and a helper world that performs tasks that need to be done asynchronously; 2) a console world, which is a special world that runs in the kernel and is associated with the COS 152; and 3) virtual machine worlds.

The kernel 202B includes a memory management module 204B that manages all machine memory that is not allocated exclusively to the COS 152. When the kernel 202B is loaded, the information about the maximum amount of memory available on the machine is available to the kernel, as well as information about how much of it is being used by the COS. Part of the machine memory is used for the kernel 202B itself and the rest is used for the virtual machine worlds.

Virtual machine worlds use machine memory for two purposes. First, memory is used to back portions of each world's memory region, that is, to store code, data, stacks, etc. For example, the code and data for the VMM 250B is backed by machine memory allocated by the kernel 202B. Second, memory is used for the guest memory of the virtual machine. The memory management module may include any of a variety of algorithms for dynamically allocating memory among the different VM's 300B, 300C.

The kernel 202B preferably also includes an interrupt/exception handler 208B that is able to intercept and handle interrupts and exceptions for all devices on the machine. However, when a VMM world is running, the VMM's Interrupt Descriptor Table (IDT) is loaded, such that the VMM will handle all interrupts and exceptions.

The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as the COS. The VMM may forward still other interrupts to the corresponding VM.

In some embodiments of the invention, the kernel 202B is responsible for providing access to all devices on the physical machine. In addition to other modules that the designer may choose to load onto the system for access by the kernel, the kernel will therefore typically load conventional drivers as needed to control access to devices. Accordingly, FIG. 2 shows a module 210B containing loadable kernel modules and drivers. The kernel 202B may interface with the loadable modules and drivers in a conventional manner, using an API or similar interface.

Multicomponent Software Applications

Multitier applications and distributed applications are two different types of multicomponent software applications. Other types of multicomponent software applications are also possible. Existing multicomponent software applications generally comprise multiple software components that are typically executed on separate physical computers.

Thus, for example, suppose that a company wants to run a multitier application comprising three software components, namely a database software component, a financial software component and a user-interface software component. Suppose further that the company purchases three server computers for running the multitier application, one for each of the software components. As is well known, installing and configuring multicomponent applications is often quite complex and time consuming. The IT (Information Technology) department of the company must first install an OS on each of the servers, bring each OS up to the right patch level, and possibly harden each system to guard against security attacks. The IT department can then install each component onto its respective server, and then configure each component. The configuration process is typically complicated by the need for the multiple components to communicate and interact with one another. Thus, each server/component must be configured not only with its own communication settings, such as IP addresses, etc., but each server/component must also be configured with the communication settings of the other server/components with which it must communicate.

Now, with such a configuration, one or more of the servers may be underutilized. In reality, all three servers are typically underutilized because surplus computing resources are typically provided to enable the computing system to handle variations in workloads. Thus, installations of multicomponent software applications are typically inefficient in their utilization of computing resources.

Now, suppose that one of the three server computers fails, such that the software component running on the failed server can no longer operate effectively. Often in such a situation, the operation of the entire multicomponent software application is disrupted until the failed server can be repaired or replaced. Then, the newly repaired server often must be reconfigured, and even the other two servers may need to be reconfigured, depending on what needed to be done with the failed server.

Now, suppose that the workload for one of the software components increases to the point that the computing resources of the component's server are inadequate to keep up with the demands. For example, suppose that the workload of the financial software component is substantially increased during one or more periods of a fiscal year, which is often the case. The IT department of the company will generally need to take some action to increase the computing resources available to the server running the financial software component, such as adding memory to the overloaded server computer or possibly adding an additional server computer to provide additional processing capabilities. In the case of adding an additional server, a second instance of the financial software component may be installed and configured on the new server computer (after an OS is loaded and patched, and possibly after the system is hardened). All of the servers and software components will typically need to be reconfigured to operate in the new four-server configuration.

In any of these scenarios, and in numerous other scenarios, the maintenance of multicomponent software applications is also quite complex and time consuming. Providing other services for multicomponent software applications, such as maintaining a backup of data, can also be more complex and time consuming than for conventional software applications. Overall, the installation, configuration and ongoing operation of multicomponent software applications can be quite complex and time consuming, and it can be inefficient in its use of hardware resources and the personnel resources of an IT department. What is needed therefore is an improved method and system for executing multicomponent software applications.

SUMMARY OF THE INVENTION

One general embodiment of the invention is a method for supporting the execution of a multicomponent software application (MCSA) in a virtual computer system, wherein multiple components of the MCSA execute within multiple virtual machines (VMs) on one or more physical computers. This method comprises allocating computing resources to the MCSA to establish MCSA computing resources; using computer software to allocate the MCSA computing resources between the multiple VMs in which the multiple components of the MCSA execute, based on information about the MCSA; and, based on observations related to the operation of the MCSA within the virtual computer system, using computer software to automatically adjust the allocation of the MCSA computing resources between the VMs in which the components of the MCSA execute.

A more specific method is the general method, further comprising monitoring the performance of the MCSA, wherein the observations relate to the performance of the MCSA relative to one or more performance objectives. Another more specific method is the general method, wherein the observations relate to an amount of computing resources allocated to the MCSA. In a still more specific method, the amount of computing resources allocated to the MCSA is adjusted automatically using computer software, in response to observations related to the amount of computing resources available within the virtual computer system. These computing resources may comprise processor cycles and system memory.

Another more specific method is the general method, further comprising using computer software to automatically determine an effective set of components for the MCSA based on the MCSA computing resources, and running this effective set of components within the multiple VMs on the virtual computer system. In a still more specific method, computer software automatically initiates execution of one or more VMs containing one or more components of the MCSA in response to the determination of the effective set of components. A still more specific method further comprises using computer software to automatically configure the one or more initiated VMs and the one or more components contained therein. These one or more initiated VMs may be initiated from pre-established VM templates.

Another more specific method is the general method, further comprising, in response to an observation related to the operation of the MCSA within the virtual computer system, using computer software to automatically start an additional VM containing an additional instance of a component of the MCSA. Another more specific method is the general method, further comprising, in response to an observation related to the operation of the MCSA within the virtual computer system, using computer software to automatically terminate a VM containing an instance of a component of the MCSA.

Another more specific method is the general method, further comprising using computer software to automatically distribute the multiple VMs in which the multiple components of the MCSA execute between multiple physical computers over which a virtualized computer platform spans. A still more specific method further comprises obtaining availability information, related to providing increased availability for the MCSA, and using the availability information as a basis when automatically distributing the multiple VMs between the multiple physical computers.

Another general embodiment of the invention is a computer program embodied in a computer readable medium, the computer program being executable in a virtual computer system in which multiple components of a multicomponent software application (MCSA) execute in multiple virtual machines (VMs), wherein computing resources are allocated to the MCSA to establish MCSA computing resources. This computer program comprises instructions for allocating the MCSA computing resources between the multiple VMs in which the multiple components of the MCSA execute, based on information about the MCSA; and instructions for, based on observations related to the operation of the MCSA within the virtual computer system, automatically adjusting the allocation of the MCSA computing resources between the VMs in which the components of the MCSA execute. More specific computer program embodiments may be analogous to the more specific method embodiments.

Another general embodiment of the invention is a computer system in which multiple components of a multicomponent software application (MCSA) execute within multiple virtual machines (VMs) on a virtualized computer platform. The computer system comprises a system manager computer program module for allocating computing resources to the MCSA to establish MCSA computing resources; and an application manager computer program module for allocating the MCSA computing resources between the multiple VMs in which the multiple components of the MCSA execute, based on information about the MCSA. Based on observations related to the operation of the MCSA within the virtual computer system, the application manager automatically adjusts the allocation of the MCSA computing resources between the VMs in which the components of the MCSA execute. More specific computer system embodiments may be analogous to the more specific method embodiments.

DETAILED DESCRIPTION

This invention may be implemented in a wide variety of computers having a wide variety of hardware architectures and configurations, and in a wide variety of groups of computers, where all computers in the group may have a common hardware architecture and configuration, or with any combination of computers having a wide variety of different hardware architectures and/or configurations. Thus, for example, the invention may be implemented in a single desktop personal computer, such as a computer based on the x86 architecture or a computer based on a hardware architecture from Apple Computer, Inc. Alternatively, the invention may be implemented in a large corporate computer network having many server computers, with each server having the same hardware architecture, such as the x86 architecture, or with the network of computers comprising a variety of servers having some mix of hardware architectures.

The invention may also be used to execute a wide variety of individual software applications or any combination of a wide variety of different software applications. The invention is particularly useful, however, for the execution of multicomponent software applications, such as a multitier software application or a distributed software application, or other groupings of multiple coordinated software components or applications. A multitier application, for example, may comprise a database software component or module, a financial software component or module and a user-interface software component or module, where the software components operate in some coordinated manner, but where the multiple software components may be executed on different computers. A distributed application, for example, may comprise a number of different software components or modules that may be executed on different computers and that each performs different portions of a complex computation, such as a weather modeling computation.

Figure 3:
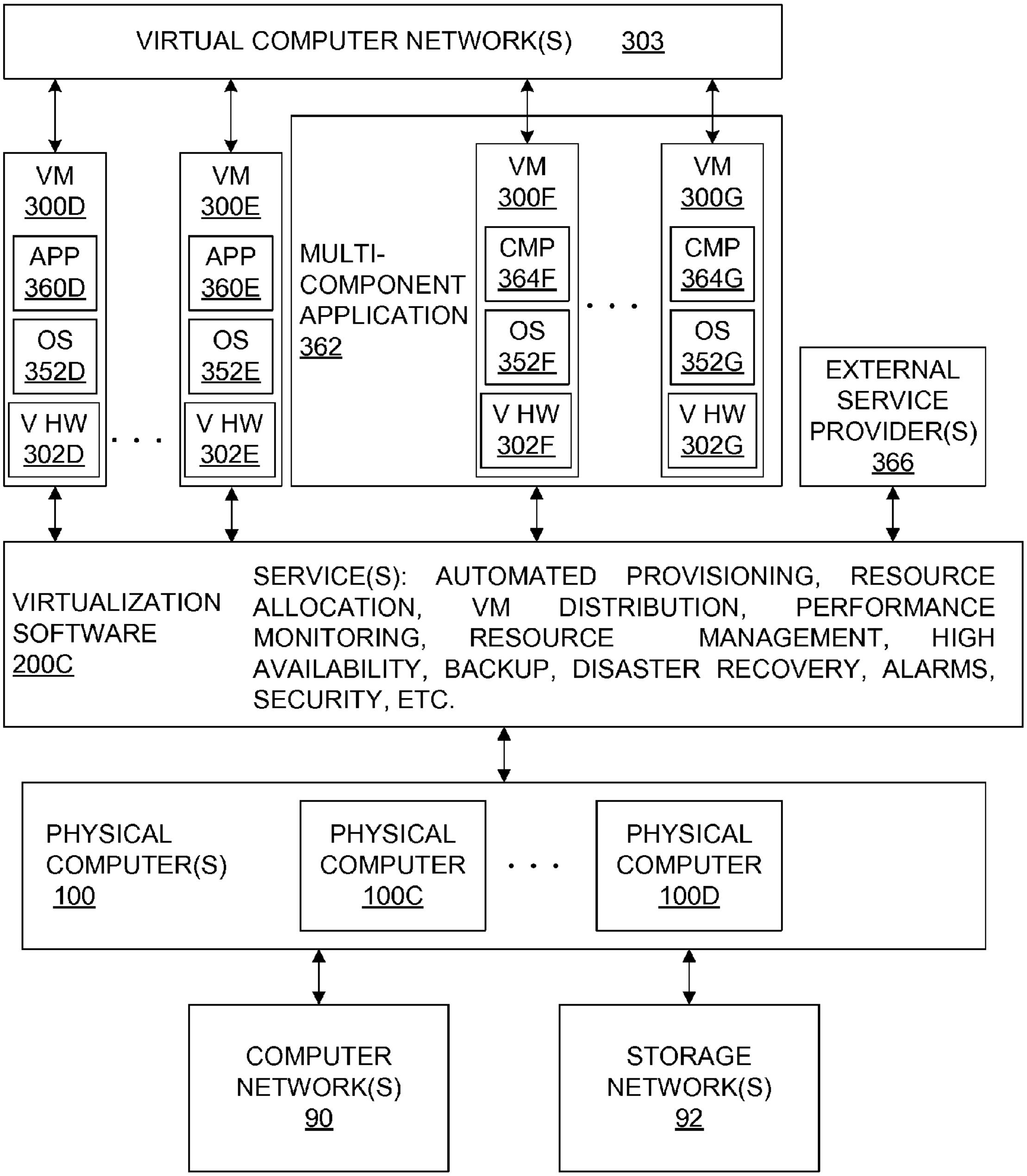
FIG. 3 illustrates a generalized implementation of the invention in which a virtualized computer platform is established and maintained on a set of physical computers for the execution of multicomponent software applications and other software applications.

FIG. 3 illustrates a generalized implementation of the invention in which a virtualized computer platform is established and maintained on a set of one or more physical computers for the execution of multicomponent software applications and other software applications. Thus, a set of physical computers 100 comprises one or more physical computers, such as a first physical computer 100C and a second physical computer 100D. If the set of physical computers 100 comprises more than one physical computer, then the multiple physical computers are typically connected together in some manner, such as by one or more ordinary computer networks, such as an Ethernet network, for example. The set of physical computers 100 may also be connected to one or more other computer networks. FIG. 3 illustrates a set of one or more computer networks 90, which represent an interconnection between the physical computers 100, as well as one or more additional computer networks to which the physical computers 100 may be connected. The set of physical computers 100 may also be connected to one or more data storage networks 92, such as a Storage Area Network (SAN), for example. There are a wide variety of other possibilities for interconnecting one or more computers, zero or more data storage devices, and a wide variety of other types of physical equipment. The invention may generally be implemented in any such configuration, so long as there are sufficient computing resources, including possibly in a single, stand-alone computer.

Virtualization software 200C executes on the set of physical computers 100 to support a virtualized computer platform. The virtualization software 200C typically comprises multiple software modules (although it typically is not implemented as a multicomponent software application, as that term is used herein), typically with one or more software modules executing on each of the physical computers in the set of physical computers 100. For the remainder of this description of FIG. 3, the set of physical computers 100 is assumed to consist of the first physical computer 100C and the second physical computer 100D, although the set of physical computers 100 may alternatively comprise more than two physical computers, or it may consist of only one physical computer.

Typically, one or more software modules of the virtualization software 200C execute on the first physical computer 100C and one or more software modules of the virtualization software 200C execute on the second physical computer 100D. For example, different instances of one or more common software applications may execute on each of the physical computers 100. The multiple software modules on the two physical computers interact and coordinate with one another to support a virtualized computer platform, which effectively spans the two physical computers 100C and 100D.

The virtualization software 200C virtualizes some or all of the physical resources in each of the physical computers 100C and 100D, such as the processors, memory, disks or other secondary data storage, and other physical devices. The virtualization software 200C may also virtualize other physical resources that are accessible from within the physical computers 100C and/or 100D, such as data storage resources in the storage networks 92.

The virtualization software 200C may fully virtualize an actual hardware platform, so that software (such as an OS) that can run on the actual hardware platform can also run on the virtualized computer platform without any modification. Alternatively, the virtualization software 200C may implement a so-called paravirtualized system, in which an actual hardware platform is not fully virtualized, so that software that runs on the actual hardware platform must be modified in some manner to run on the virtualized computer platform. The virtualization software 200C may also virtualize a hardware platform that is partially, substantially, or completely different from the hardware platform of the underlying physical computer(s), creating a cross-platform virtualization. As yet another alternative, the virtualization software 200C may virtualize a hardware platform that is unlike any hardware platform that has ever been implemented in a physical computer, so that software must be specially designed to run on the virtualized computer platform. Still other types of virtualization software 200C are also possible.

Virtualization software executes on the first physical computer 100C to virtualize resources of the first physical computer, and virtualization software executes on the second physical computer 100D to virtualize resources of the second physical computer. The virtualization software that executes on the first physical computer 100C and the virtualization software that executes on the second physical computer 100D may be different instances of a common computer program, especially if the two physical computers have a common architecture. Alternatively, the virtualization software that executes on the first physical computer 100C and the virtualization software that executes on the second physical computer 100D may be different computer programs, especially if the hardware architecture of the first physical computer 100C is different from the hardware architecture of the second physical computer 100D. One or more other software modules may also execute on either or both of the physical computers 100C and 100D for performing other functions.

As one example, the virtualization software 200C may comprise a first instance of the virtualization software 200B of FIG. 2 executing on the first physical computer 100C and a second instance of the virtualization software 200B executing on the second physical computer 100D, but with both instances of the virtualization software 200B being modified to implement the invention, which is described in greater detail below.

Figure 1:
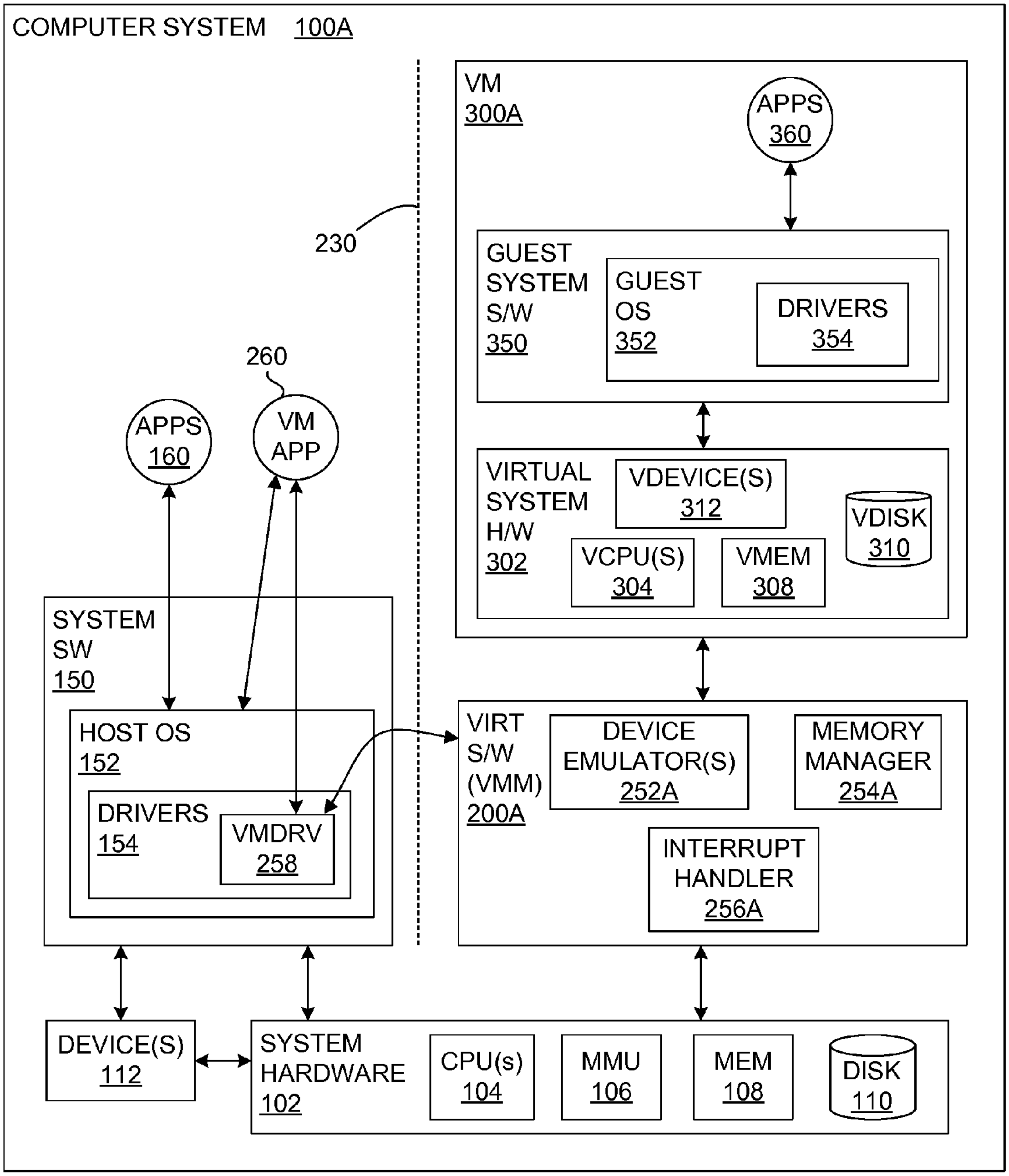
FIG. 1 illustrates the main components of a generalized hosted virtual computer system.
Figure 2:
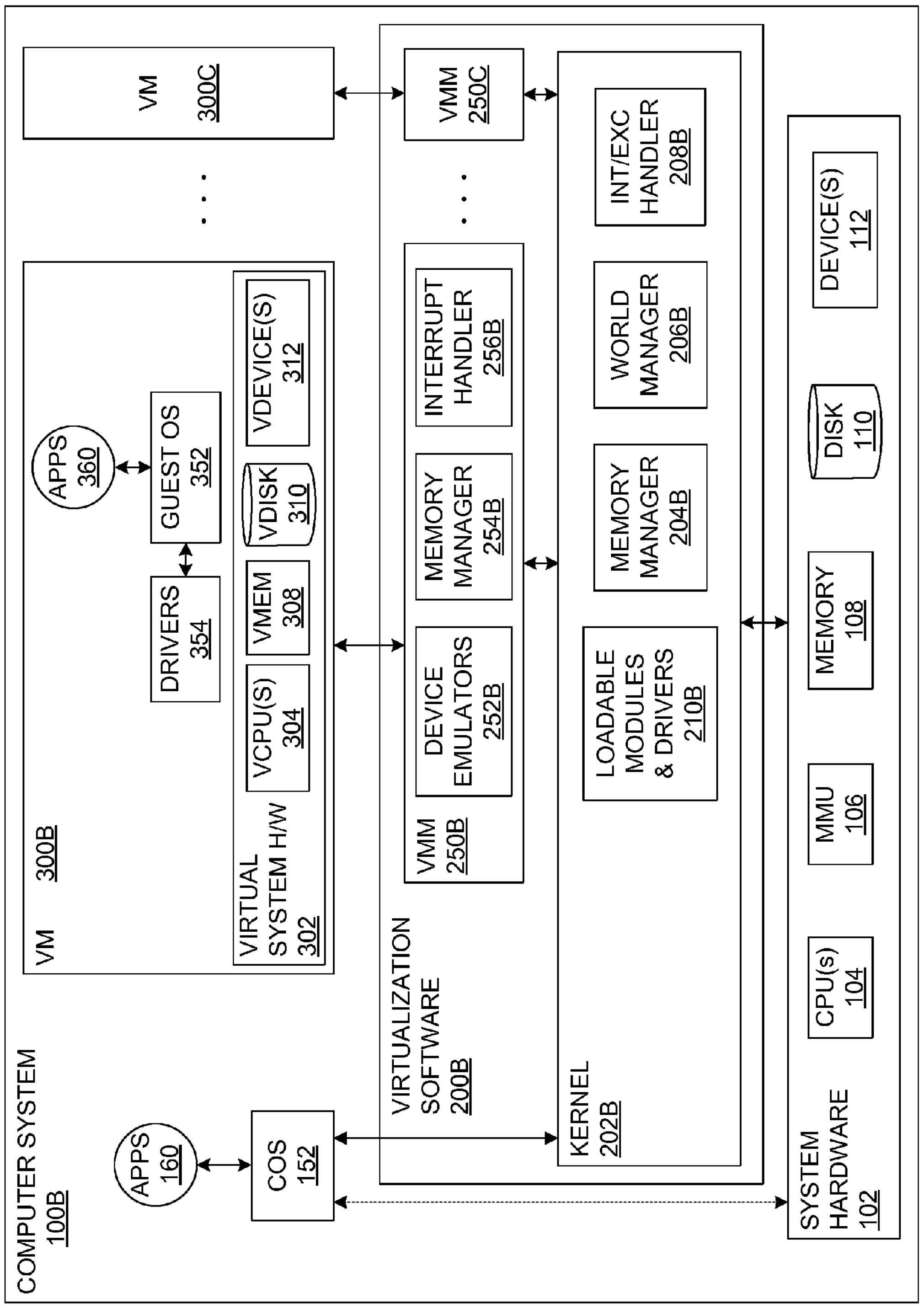
FIG. 2 illustrates the main components of a generalized kernel-based virtual computer system.

The virtualized computer platform established and maintained by the virtualization software 200C generally supports one or more VMs, such as the VMs 300A, 300B and 300C of FIGS. 1 and 2. FIG. 3 shows the virtualization software 200C supporting a VM 300D and a VM 300E. The virtualization software 200C may support the VMs 300D and 300E in much the same way that the virtualization software 200A supports the VM 300A or in much the same way that the virtualization software 200B supports the VMs 300B and 300C. The VMs 300D and 300E may be substantially the same as the VMs 300A, 300B and 300C, or they may be substantially different. Thus, the VM 300D has a virtual system hardware 302D and the VM 300E has a virtual system hardware 302E, each of which may be substantially the same as the virtual system hardware 302, or each of which may be substantially different; the VM 300D has a guest OS 352D and the VM 300E has a guest OS 352E, each of which may be substantially the same as the guest OS 352, or each of which may be substantially different; and the VM 300D has one or more applications 360D and the VM 300E has one or more applications 360E, each set of which may be substantially the same as the applications 360, or each set of which may be substantially different. Any of a wide variety of software applications may execute within the VMs 300D and 300E, including any of the software applications that may execute in existing virtualization products of VMware, Inc. Alternatively, the VMs 300D and/or 300E may implement different hardware and/or software architectures and/or configurations from existing VMware virtualization products, so that entirely different software applications may execute within the VMs 300D and/or 300E.

The virtualized computer platform may also support the execution of one or more multicomponent software applications within one or more VMs. Thus, for example, FIG. 3 shows a multicomponent application 362 comprising multiple software components executing in one or more VMs, such as a VM 300F and a VM 300G. In particular, the multicomponent application 362 comprises one or more software components 364F executing in the VM 300F and one or more software components 364G executing in the VM 300G. The VMs 300F and 300G may be substantially the same as the VMs 300A, 300B and 300C, or they may be substantially different. Thus, the VM 300F has a virtual system hardware 302F and the VM 300G has a virtual system hardware 302G, each of which may be substantially the same as the virtual system hardware 302, or each of which may be substantially different; and the VM 300F has a guest OS 352F and the VM 300G has a guest OS 352G, each of which may be substantially the same as the guest OS 352, or each of which may be substantially different. The software components 364F and 364G may be substantially similar to the applications 360, except that they combine to form a multicomponent software application, such as a multitier application or a distributed application.

As described above, existing multicomponent software applications are generally designed to execute on a plurality of physical computers that are interconnected in some manner, such as by an Ethernet network. Each software component of such multicomponent software applications typically executes on a separate physical computer, and the different software components interact and communicate with one another by the interconnection means, such as the Ethernet network. The virtualization software 200C may export virtual hardware that satisfies the requirements for running such existing multicomponent software applications. Thus, the virtualization software 200C may export virtual hardware that appears, to such a multicomponent software application, to be multiple physical computers that are interconnected in some manner, such as by an Ethernet network. In this manner, existing multicomponent software applications may execute in the VMs 300F and 300G, without any modifications to the existing components of the multicomponent software applications. Alternatively, existing multicomponent software applications may be modified for execution in the VMs 300F and 300G.

The VM 300F and the VM 300G may appear, to the software components 364F and 364G, to be separate, complete physical computers. Also, as shown in FIG. 3, the VMs 300F and 300G may be interconnected by one or more virtual computer networks 303, which may be virtualized by the virtualization software 200C. The virtual computer network(s) 303 may comprise, for example, an Ethernet network. Thus, the VMs 300F and 300G may appear, to the software components 364F and 364G, to be separate, complete physical computers, interconnected in some appropriate manner, such as by an Ethernet network. The virtual computer network(s) 303 may also connect to the VMs 300D and 300E, as also illustrated in FIG. 3. Now, from the perspective of the software components 364F and 364G, the virtual system hardware 302F and 302G, along with the virtual computer network(s) 303, may function substantially the same as separate physical computers that are interconnected by one or more physical computer networks. Thus, the software components 364F and 364G may execute in the VMs 300F and 300G in the same manner as they would execute in separate physical computers interconnected by one or more physical computer networks.

One aspect of this invention is that the virtualization software 200C provides one or more services to enhance the operation of the application(s) running within the VMs that are supported by the virtualized computer platform, such as the VMs 300D, 300E, 300F and 300G. In particular, the virtualization software 200C may provide services that enhance the operation of multicomponent software application(s) running on the virtualized computer platform, such as the multicomponent software application 362.

For example, the virtualization software 200C may provide for the automated provisioning of new VMs, of software applications, including multicomponent software applications, and of new instances of components of multicomponent software applications. The virtualization software 200C may also allocate computing resources, possibly including processor time, memory and secondary storage among other possible resources, between the multiple VMs supported by the virtualized computer platform, between the software application(s) running in the system, including multicomponent software application(s), and between the multiple components of multicomponent software application(s). The virtualization software 200C may also distribute the VMs that are supported on the virtualized computer platform between the multiple physical computers 100, so that a first set of one or more VMs is running on the first physical computer 100C and a second set of one or more VMs is running on the second physical computer 100D, for example.

The virtualization software 200C may also monitor the performance of application(s) running on the virtualized computer platform, for example, to determine whether the application(s) are still running at all, to determine whether individual components of a multicomponent application are still running, and/or to determine the levels that are being achieved for certain metrics that indicate, for example, how effectively the application(s) are performing their assigned function(s). The metrics that are monitored may be specific to an individual application, or they may be more generic metrics, or they may be some combination of generic and specific metrics. In response to the results of the performance monitoring, the virtualization software 200C may also manage the computing resources, possibly altering the allocation of resources between VMs, applications and components of applications, in view of predefined policies and service level objectives, or performance objectives.

The virtualization software 200C may also take various measures to improve the ability of software application(s) to continue operating effectively in the event of one or more failures within the physical computers 100 or in other physical hardware connected directly or indirectly to the physical computers 100, thereby improving the availability of the software application(s). For example, referring again to FIG. 3, suppose that the software component 364F and the software component 364G are different instances of a common computer program, and that ensuring that one of the two instances continues running would improve the availability of the multicomponent software application 362. In this case, the virtualization software 200C may ensure that the VM 300F, in which the component 364F is executing, and the VM 300G, in which the component 364G is executing, run on different physical computers 100, so that a failure related to one of the physical computers is less likely to interfere with the operation of both of the components 364F and 364G. Thus, the virtualization software 200C may cause the VM 300F to run on the first physical computer 100C, and it may cause the VM 300G to run on the second physical computer 100D, for example. Then, if there is a failure in the first physical computer 100C that interferes with the operation of the component 364F, hopefully the other component 364G will be able to continue operating normally, so that the entire multicomponent software application 362 is still able to function, even if at a reduced level of performance.

The virtualization software 200C may also take various measures to improve the ability of software application(s) to continue operating effectively in the event of one or more software failures, again thereby improving the availability of the software application(s). For example, if, for some reason, the component 364F crashes, or otherwise ceases to operate effectively, the virtualization software 200C may take some action to try to get the component 364F to resume normal operation. For example, the virtualization software 200C may restart the VM 300F, and get the component 364F operating again.

The virtualization software 200C may also provide data backup services, including possibly real-time data backup. The virtualization software may also provide miscellaneous other services, such as disaster recovery, alarms and security.

Many of the services mentioned above may be provided on an ongoing basis during the operation of the computer system, and adjustments may be made to account for various changes in the computer system or affecting the computer system, such as workload changes, hardware failures or other changes to the physical hardware, or a variety of other changes affecting the operating environment in or around the physical computers 100. For example, if there is some sort of hardware failure within the physical computer 100C that somehow limits the computing resources available within that physical computer, the virtualization software 200C may cause one or more of the VMs supported on the virtualized computer platform to migrate from the first physical computer 100C to the second physical computer 100D. The migration of VMs from one physical computer to another is disclosed in U.S. patent application Ser. No. 10/319,217 ("Virtual Machine Migration"), which is incorporated here by reference. The services mentioned above, and the manner in which they are provided to the applications running on the virtualized computer platform, are described in greater detail below.

For each of the services mentioned above, along with other possible services that may be provided to application(s) running on the virtualized computer platform, the ability to provide the respective service may be built into the virtualization software 200C, or the service may be provided by other software programs that interface with the virtualization software 200C. Thus, FIG. 3 also shows a set of external service provider(s) 366 that interface with the virtualization software 200C, and that may provide one or more of the services mentioned above, or one or more other services. One or more of the services may also be provided by the virtualization software 200C in combination with an external service provider 366. As another alternative, both the virtualization software 200C and an external service provider 366 may provide one or more of the services independently, so that a system administrator can select which software entity is to provide the service for a particular implementation or for different software modules or applications within a particular implementation.

The interface between the external service providers 366 and the virtualization software 200C may be any of a wide range of interfaces. As one example, an API may be implemented to allow the external service providers 366 and the virtualization software 200C to communicate and interact with one another. Such an interface may be referred to as a service provider interface (SPI). A single SPI may be implemented for all service providers 366 that may want to interface with the virtualization software 200C, or a separate SPI may be implemented for each type of service provider 366 that can interface with the virtualization software 200C, or some other arrangement of SP Is may be implemented.

Some or all of the software for the external service providers 366 may execute on the physical computers 100, along with the virtualization software 200C, or some or all of the software for the external service providers may execute on other physical computers that interface with the physical computers 100. An external service provider could even operate on a remote computer operated by a different organization, so that the other organization provides the service for the benefit of the organization operating the virtualized computer platform. The other organization that provides such a service may be the same organization as the vendor of the virtualization software 200C, or it may be a different organization.

Figure 4A:
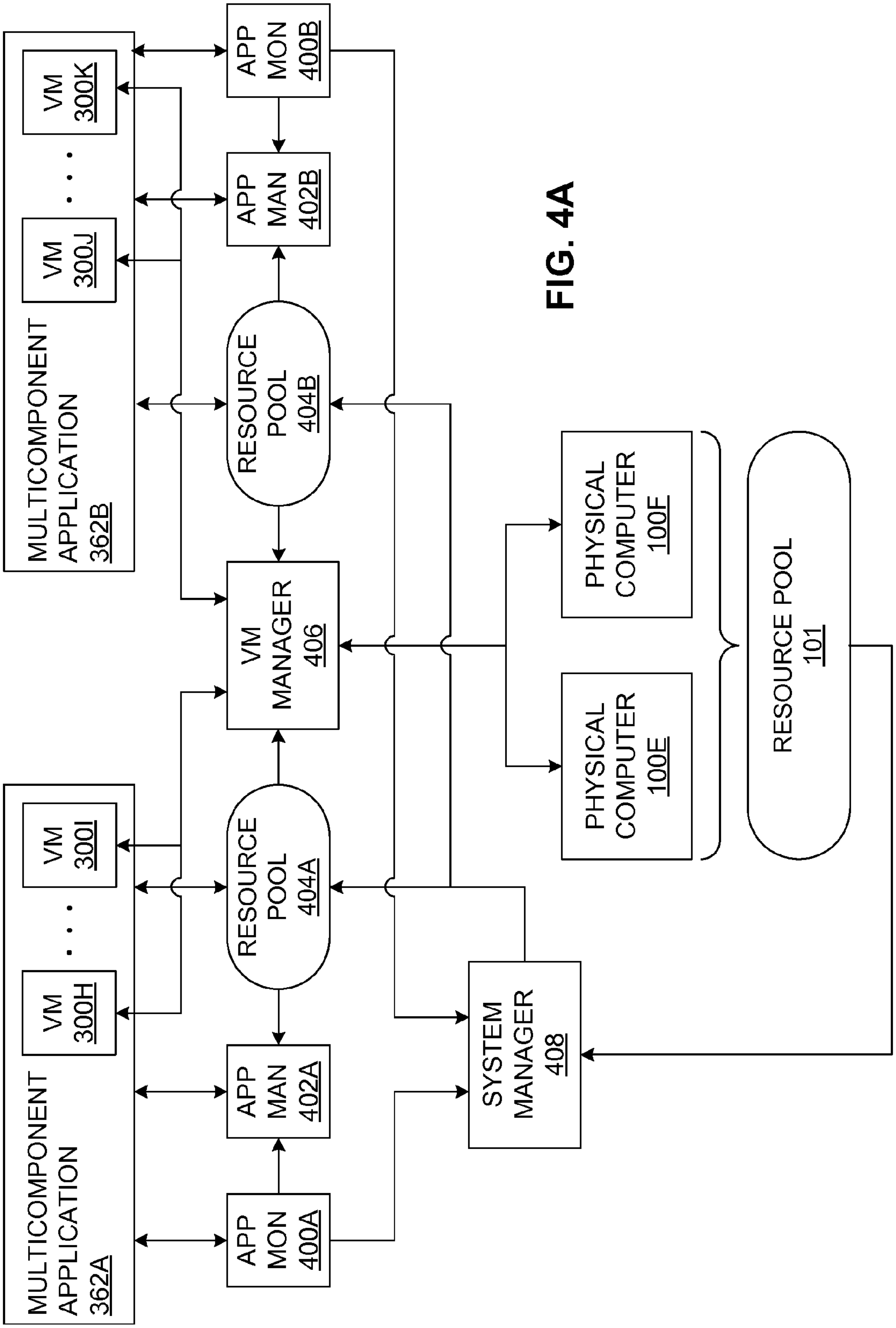
FIG. 4A illustrates the allocation, monitoring and management of physical and virtual computing resources in a virtualized computer platform for executing multicomponent software applications.

FIG. 4A illustrates selected functional units of one general implementation of the invention, providing some of the services mentioned above, including automated provisioning, resource allocation, VM distribution, performance monitoring, resource management and high availability services. The functional units illustrated in FIG. 4A may be implemented as separate software components that directly correspond with the separate functional units illustrated in FIG. 4A, or they may be implemented in a wide variety of other software configurations.

FIG. 4A shows a first physical computer 100E and a second physical computer 100F. There may alternatively be additional physical computers in such a computer system, or there may only be one physical computer. There may also be additional hardware devices connected directly or indirectly to the physical computers 100E and 100F, such as the computer network(s) 90 or the storage network(s) 92 of FIG. 3. Virtualization software, such as the virtualization software 200C of FIG. 3, executes on the physical computers 100E and 100F to establish and maintain a virtualized computer platform as described above, although the virtualization software is not illustrated in FIG. 4A for generality.

A first multicomponent software application 362A and a second multicomponent software application 362B run on the virtualized computer platform in the same general manner as the multicomponent application 362 of FIG. 3. The first multicomponent application 362A comprises a plurality of VMs, including a VM 300H and a VM 300I, with a software component executing in each VM. The second multicomponent application 362B also comprises a plurality of VMs, including a VM 300J and a VM 300K, again with a software component executing in each VM. Each of the multicomponent applications 362A and 362B may be substantially the same as the multicomponent application 362 of FIG. 3, or they may be substantially different. Also, each of the VMs 300H, 300I, 300J and 300K may be substantially the same as the VMs described above, such as the VM 300F of FIG. 3, or they may be substantially different. Thus, each of the VMs 300H, 300I, 300J and 300K may comprise virtual system hardware, such as the virtual system hardware 302F; a guest OS, such as the guest OS 352F; and a software component, such as the software component 364F.

There may also be additional multicomponent software applications running on the virtualized computer platform, or, as another alternative, there may only be one multicomponent software application, instead of two. The virtualized computer platform may also support other VMs, in which conventional software applications execute, instead of multicomponent software applications. The two multicomponent software applications 362A and 362B are shown in FIG. 4A merely as one example implementation of the invention.

The physical computers 100E and 100F, possibly along with other hardware devices connected directly or indirectly to the physical computers, provide certain physical computing resources that may be used for the execution of the multicomponent applications 362A and 362B. Some or all of such computing resources may be virtualized, while other resources may be provided without virtualization or with only partial virtualization. Such computing resources may include a variety of resources, such as processor cycles for executing instructions, system memory, secondary storage, interrupts, timers, and access to various devices. The description below is limited to the computing resources of processor cycles and primary memory for simplicity, although it may also be extended to other computing resources.

All of the available processor cycles of all of the processors in both the first physical computer 100E and the second physical computer 100F may be added together to determine the total number of processor cycles available in the system. In the same manner, all of the system memory in both the first physical computer 100E and the second physical computer 100F may be added together to determine the total amount of memory available in the system. Now, some of these computing resources will be consumed by the virtualization software that supports the virtualized computer platform, and possibly by other software applications running on the physical computers 100E and 100F, such as external service providers, for example. All remaining computing resources may be used for the execution of the multicomponent software applications 362A and 362B. These remaining computing resources may effectively be combined together to form a resource pool 101, as illustrated in FIG. 4A. The processor cycle resources available in the resource pool 101 may be specified in MHz (megahertz), while the system memory in the pool may be specified in MB (megabytes).

A system manager 408, illustrated in FIG. 4A, is responsible for allocating the computing resources in the resource pool 101 between the multicomponent software applications 362A and 362B (along with any other multicomponent software applications and any conventional software applications that may be running on the virtualized computer platform). The system manager 408 obtains information about the resource needs of the multicomponent applications 362A and 362B in some manner. The resource information may comprise any combination of a wide variety of different parameters, including possibly minimum amounts of processor and memory resources required for each application, preferred amounts of processor and memory resources for each application, maximum amounts of processor and memory resources that may be useful to each application, relative priorities between the applications for resources beyond the required minimums, service level objectives (or performance objectives) that are preferably achieved for each application or service level guarantees (or performance guarantees) that must be satisfied, if at all possible. A wide variety of other parameters may also, or alternatively, be specified, depending on a particular implementation.

The resource information may be delivered to the system manager 408 in a wide variety of manners, as well. For example, a system administrator may use an application running on a console OS supported by the virtualization software, such as is described above relative to FIG. 2, to specify resource allocation parameters and application performance parameters for each of the multicomponent applications 362A and 362B. As another alternative, the resource information for each multicomponent application may be obtained directly from the application itself. The available literature related to computer software describes numerous methods by which information may be obtained directly from a software application. As just one example, an installation package that includes a multicomponent software application may also include a separate data file that specifies the resource information. The resource information may also be obtained from a combination of two or more sources. For example, default resource information may be supplied along with a multicomponent software application, but a system administrator may also be able to override one or more of the parameters obtained from the application. As another example, most of the resource information may be supplied along with multicomponent software applications, but a system administrator may specify the relative priorities between multiple multicomponent software applications, so that, for example, meeting performance objectives for one multicomponent software application may be set as a higher priority than meeting the performance objectives for another multicomponent software application. In some embodiments, the resource information may vary from time to time, such as according to a schedule, for example, or the resource information may be modified from time to time, such as by a system administrator. Thus, for example, different applications may be given different relative priorities at different times of the year, quarter, month, day, etc., depending on business requirements or other factors.

The system manager 408 takes the computing resources available in the resource pool 101 and allocates them between the first multicomponent software application 362A and the second multicomponent software application 362B, based on the resource information obtained for each of the multicomponent applications. Specifically, in one embodiment, the system manager 408 allocates a first specific number of MHz of processor resources and a second specific number of MB of system memory to the first multicomponent software application 362A, and a third specific number of MHz of processor resources and a fourth specific number of MB of system memory to the second multicomponent software application 362B. The computing resources allocated to the first multicomponent software application 362A may be viewed as a resource pool 404A, and the computing resources allocated to the second multicomponent software application 362B may be viewed as a resource pool 404B, as illustrated in FIG. 4A.

A wide variety of methods may be used to determine an appropriate allocation of the available resources between the multicomponent software applications, based on the obtained resource information. As one example, the system manager 408 may apply one or more system resource allocation policies that specify how the computing resources are to be allocated, depending on the obtained resource information and on the quantities of computing resources. The allocation policies may be specified by a system administrator, for example, or they may be established by a variety of other means. As just one example of such a system resource allocation policy, the system manager 408 may first be required to meet minimum resource requirements for the second multicomponent application 362B, if possible, followed by minimum resource requirements for the first multicomponent application 362A, followed by preferred resource allocations for the second multicomponent application 362B, and then followed by preferred resource allocations for the first multicomponent application 362A.

An application manager is associated with each multicomponent software application running on the virtualized computer platform, and the application manager allocates resources between the multiple components of the respective multicomponent software applications. The multiple application managers may be combined into a single software entity, although they typically manage resources for each multicomponent software application independently of the other multicomponent software applications. Multiple application managers may also comprise multiple instances of a common software entity, or they may comprise distinct software entities, or they may comprise some combination of common and distinct software entities.

Thus, an application manager 402A is associated with the multicomponent application 362A and an application manager 402B is associated with the multicomponent application 362B. The application manager 402A allocates the computing resources available in the resource pool 404A between the multiple VMs that support the execution of the first multicomponent software application 362A, such as the VMs 300H and 300I; while the application manager 402B allocates the computing resources available in the resource pool 404B between the multiple VMs that support the execution of the second multicomponent software application 362B, such as the VMs 300J and 300K.

The process by which the application managers 402A and 402B allocate resources between their respective VMs may be substantially the same as the process by which the system manager 408 allocates resources between the multicomponent software applications 362A and 362B. In fact, the application managers 402A and 402B could be implemented as separate instances of the same software application that implements the system manager 408, for example. Thus, the application managers 402A and 402B may obtain information about the resource needs of the respective VMs 300H and 300I or 300J and 300K in some manner, and they may apply one or more resource allocation policies to determine an appropriate allocation of resources between their respective VMs. The resource information for a given VM is dependent on the particular software component that is executing within the VM. Thus, information about resource needs may be specified for each of the different types of software components in a multicomponent software application, instead of being specified for each particular VM. The resource allocation policies applied by the application managers may be specific to a given multicomponent software application, or they may be more general, so that they can apply to a plurality of multicomponent software applications. Often, however, the resource information and the resource allocation policies will be specific to a particular multicomponent software application, and they will often be provided along with the multicomponent software application by the developer of the software application, instead of being specified in some other manner, such as by a system administrator. In other embodiments of the invention, the process by which the application managers 402A and 402B allocate resources between their respective VMs may be substantially different from the process by which the system manager 408 allocates resources between the multicomponent software applications 362A and 362B. Also, in some embodiments, the processes implemented by multiple application managers may differ substantially from one another.

The application managers 402A and 402B may also perform other functions related to the allocation of computing resources between the respective VMs. For example, suppose that additional computing resources become available for some reason, such as by the addition of another physical computer. Thus, the resource pool 101 becomes larger, and the system manager 408 allocates the increased resources between the multicomponent applications 362A and 362B, so that the resource pools 404A and/or 404B become larger. For this example, suppose that the resource pool 404A is made larger. Now, based on the design of the multicomponent software application 362A, the application may need an additional instance of one of its software components to fully take advantage of the increased resources. The resource information obtained by the application manager 402A may also specify how many instances of each software component there should be, depending on the circumstances. Based on this information and the increased size of the resource pool 404A, the application manager 402A may determine that an additional instance of a software component should be created.

The application manager 402A can then cause a new VM to be created that contains a new instance of the particular software component. The application manager 402A also adjusts the allocation of resources from the resource pool 404A amongst the VMs that support the multicomponent application 362A to account for the newly added VM. The application manager 402A can then configure the new VM and the new instance of the software component, and possibly the other VMs (and the software components executing therein) that support the multicomponent application 362A so that the multicomponent application functions properly with the addition of the new instance of the software component. The application manager 402A can then cause the new VM to begin executing, so that the new instance of the software component begins executing.

One method by which the application manager 402A may cause a new VM containing a new instance of a software component to begin executing involves copying a VM template, where the VM template contains a copy of the software component, as well as other software and data, typically including an OS on which the software component executes. Techniques for "encapsulating" a VM so that it can be copied or "cloned," and so that the clone can begin executing are described in U.S. Pat. No. 6,795,966 ("Mechanism for restoring, porting, replicating and checkpointing computer systems using state extraction"), which is incorporated here by reference. Techniques such as these may be used to create multiple VM templates with each VM template containing a different one of the software components in a multicomponent application. The software stack in each of the VMs, including an OS, the software components, drivers, etc., may be preconfigured and optimized, so that the templates may simply be copied, as needed, to create VMs containing the different instances of the different software components. Thus, when the application manager 402A determines that another instance of a software component should be initiated, the application manager copies the appropriate VM template, configures the new VM and possibly reconfigures other VMs, as required, and initiates the execution of the new VM. The application managers 402A and 402B can also suspend, resume and terminate VMs supporting the respective multicomponent applications 362A and 362B, as needed or desired.

The above description, related to the resource pool 404A, the application manager 402A and the multicomponent application 362A, may also be applied to the resource pool 404B, the application manager 402B and the multicomponent application 362B.

FIG. 4A also shows a VM manager 406. The VM manager 406 distributes the VMs that support the multicomponent applications 362A and 362B, such as the VMs 300H, 300I, 300J and 300K, between the physical computers 100E and 100F, based on the computing resources that are available on each of the physical computers and the computing resources that have been allocated to each of the VMs. Thus, for example, the VM manager 406 may cause the VMs 300H, 300I and 300K to execute on the first physical computer 100E, while it causes the VM 300J to execute on the second physical computer 100F. The VM manager 406 may receive information about the multicomponent applications 362A and 362B, in much the same way that resource information is provided to the system manager 408 and to the application managers 402A and 402B. For example, the VM manager 406 may receive information regarding steps that may be taken to increase the availability of the multicomponent applications 362A and 362B, such as an indication that availability can be increased by executing VMs containing specific components of the applications on separate physical computers. The VM manager 406 may then use this availability information or other information when distributing VMs between the physical computers 100E and 100F. As, described above, the VM manager 406 may cause VMs to migrate from one physical computer to another, as desired.

There is also an application monitor associated with each multicomponent software application running on the virtualized computer platform. The multiple application monitors may also be combined into a single software entity, although they typically monitor the performance of each multicomponent software application independently of the other multicomponent software applications. Multiple application monitors may also comprise multiple instances of a common software entity, or they may comprise distinct software entities, or they may comprise some combination of common and distinct software entities.

Thus, an application monitor 400A is associated with the multicomponent application 362A and an application monitor 400B is associated with the multicomponent application 362B. The application monitor 400A monitors the status and/or performance of the multicomponent application 362A, while the application monitor 400B monitors the status and/or performance of the multicomponent application 362B. The following description will focus primarily on the operation of the application monitor 400A for simplicity, although it also applies to the application monitor 400B.

The operation of the application monitor 400A may vary substantially, depending on the particular implementation. In some implementations, the application monitor 400A may only monitor very basic functionality of the multicomponent application 362A, such as whether the application and/or whether individual components of the application are responsive at all. In other implementations, the application monitor 400A may monitor one or more metrics that reflect more detailed, but still generic (i.e. applicable to a variety of different types of multicomponent applications), functionality of the multicomponent application 362A, such as whether any components in the application are starved for a specific resource, such as memory. In other implementations, the application monitor 400A may monitor one or more metrics that reflect more detailed functionality that is specific to the multicomponent application 362A. For example, for a software component that interfaces with a database, the application monitor 400A may monitor delays that occur when the software component retrieves records from the database. The types of metrics or other information that are monitored by the application monitor 400A may vary substantially for different types of multicomponent applications and for different types of components within a multicomponent application. The application monitor 400A may receive information about the multicomponent application 362A to enable the application monitor 400A to perform this application-specific monitoring, such as from a system administrator or from a data file that is included with the multicomponent application 362A, as just two examples. In still other implementations, the application monitor 400A may monitor some combination of general and detailed generic functionality, as well as general and detailed functionality that is specific to the multicomponent application 362A.

The application monitor 400A may provide the metrics and other information that it obtains to various destinations, depending on the particular implementation. In some implementations, the application monitor 400A may provide monitoring information to the system manager 408. The system manager 408 may then use the monitoring information in determining an appropriate allocation of resources from the resource pool 101 to the respective resource pools 404A and 404B. For example, the system manager 408 may implement a service level objective that is based on one or more metrics that are monitored by the application monitor 400A. For example, a system administrator may specify a maximum delay target, indicating a goal for how long it should take, on average, for a software component to retrieve a record from a database. The application monitor 400A may monitor this delay and report the average length of the delay to the system manager 408. If the system manager 408 determines that the maximum delay target is being exceeded, then the system manager 408 may increase the size of the resource pool 404A and decrease the size of the resource pool 404B, such as by increasing the allocation of processor time in the resource pool 404A and decreasing the allocation of processor time in the resource pool 404B, as needed, until the average delay detected by the application monitor 400A satisfies the specified goal.

In other implementations, the application monitor 400A may provide monitoring information to the application manager 402A. The application manager 402A may also take various actions based on the monitoring information, such as adjusting the allocation of resources from the resource pool 404A between the multiple components of the application 362A, initiating a new VM with a new instance of one of the components of the application 362A, or suspending or resuming the execution of a VM.

In other implementations, the application monitor 400A may provide monitoring information to the VM manager 406. The VM manager 406 may also take various actions based on the monitoring information. For example, suppose that monitoring information provided to the VM manager 406 indicates or suggests that a component of the multicomponent application 362A is being starved of data from an attached SAN. Suppose further that this component is running inside the VM 300H, which is executing on the first physical computer 100E. Suppose further that the VM manager 406 is able to determine that one or more other VMs that are also executing on the first physical computer 100E are consuming most of the available data bandwidth between the physical computer 100E and the SAN. In this case, the VM manager 406 may cause the VM 300H to migrate to the second physical computer 100F in an effort to alleviate the data bandwidth constraint on the component running in the VM 300H.

In other implementations, the application monitor 400A may provide monitoring information to a system administrator, such as through an application running on a console OS. The system administrator may also take various actions based on the monitoring information. For example, the system administrator may determine that desired performance levels for all applications running on the virtualized computer platform cannot be achieved with existing physical computing resources, and the system administrator may add additional physical computing resources, such as an additional physical computer. As another alternative, the system administrator may detect some sort of drop off in the performance of one or more applications running on the virtualized computer platform. The system administrator may then investigate to determine if there is some hardware or software failure that is causing the performance decline, and take some sort of remedial action.

In different embodiments of the invention, monitoring information may be provided to various combinations of one or more entities, including possibly the system manager 408, the application managers 402A and 402B, and a system administrator, along with other possible entities. Also, in some embodiments of the invention, different monitoring information may be provided to different entities. Also, in some embodiments of the invention, the monitoring information that is provided to different entities may vary over time, possibly depending on specific conditions or circumstances. Also, the evaluation of monitoring information that is performed by different entities may vary between different embodiments. For example, in some embodiments, the application monitor 400A may simply obtain the monitoring information and forward the information to the appropriate destinations, leaving it to the destinations to perform evaluations of the information. In other embodiments, the application monitor 400A may evaluate some or all of the monitoring information, and its subsequent actions may be based on the results of the evaluation(s). For example, the application monitor 400A may send an alert to the system manager 408, the application manager 402A, a system administrator and/or some other entit(ies), if the application monitor 400A determines that a service level objective is not being satisfied.

The system manager 408, the VM manager 406 and the application managers 402A and 402B may continuously or continually monitor information about the status and operation of the virtualized computer system, and each of these functional units may take various actions in response to their observations. Often, an observation by one of these units may lead to an action by that unit, which may then lead to an observation and/or action by one or more of these other functional units, in a chain reaction manner. For example, as described above, if an additional physical computer is added to the virtual computer system, providing additional computing resources in the resource pool 101, the system manager 408 may respond by increasing the size of the resource pool 404A, for example. In response to the increase in the resource pool 404A, the application manager 402A may create and start a new VM containing a new instance of one of the components of the multicomponent software application 362A. The VM manager 406 may then rearrange the placement of the VMs in the virtual computer system between the physical computers 100E and 100F, in response to the creation of the new VM by the application manager 402A.

Alternatively, more than one of these functional units may respond to the same stimulus at the same general time. For example, suppose that the physical computer 100F has some failure such that no VMs can run on that physical machine. The system manager 408 may determine that the physical computer 100F has failed, so that the computing resources of that physical computer are no longer available within the resource pool 101. In response, the system manager 408 may reduce the size of the resource pool 404A and/or the resource pool 404B. Depending on the implementation and the circumstances at the time of the failure, for the VMs that were running on the physical computer 100F, the application monitors 400A and 400B may also detect that corresponding components of the multicomponent software applications 362A and 362B are no longer functioning. The application monitors 400A and 400B may then notify their respective application managers 402A and 402B that these components are no longer functioning. The application managers 402A and 402B may then respond by creating new VMs containing new instances of each of the failed components. The VM manager 406 may also determine that the physical computer 100F is no longer available for running VMs, and so the VM manager 406 may cause all of the new VMs created by the application managers 402A and 402B to run on the other physical computer 100E.

These functional units may also coordinate with one another in a wide variety of ways. For example, consider a specific component of the multicomponent software application 362A. Suppose that there is only one instance of that component running in a single VM on the physical computer 100E. Suppose, however, that there are unused computing resources available on the other physical computer 100F that could benefit the specific component. The VM manager 406 may coordinate with the application manager 402A to cause a second instance of the specific component to be created within a new VM. The VM manager 406 can then cause the new VM to run on the physical computer 100F, so as to benefit from the unused computing resources available on that physical computer. In various manners such as this, the functional units illustrated in FIG. 4A can share information and/or coordinate activities with one another to enhance the overall operation of the virtual computer system.

As indicated above, the functions of the system manager 408, the VM manager 406, the application managers 402A and 402B and the application monitors 400A and 400B may be implemented in a wide variety of software configurations. Each functional unit illustrated in FIG. 4A may be implemented in a separate software component, with a one-to-one correspondence between the functional units and the software components, or these functions may be performed by some other configuration of one or more software components. Multiple functional units may be implemented within a single software component and/or a single functional unit may be split between multiple software components. Also, separate functions within a given functional unit may be implemented in different software components, individual functions from multiple functional units may be combined within a single software component, and/or the individual functions within each of these functional units may be distributed between one or more software components in a wide variety of other possible software configurations. As just one example, the functions of the application manager 402A and the application monitor 400A may be combined into a single software component, or they may be performed by separate software components.

Also, depending on the particular configuration of these functional units, the different software components may communicate and interact with one another in a wide variety of different ways. For example, if multiple functional units are implemented in a common software application, such as in a virtualization software layer, then these units may communicate and interact with each other in any known (or yet to be developed) manner by which multiple routines of a common application may communicate or interact with one another, such as by using common data structures in memory, by making function calls, etc. If different functional units are in distinct software applications, however, then different methods may be used for communications and interactions between the functional units in different software applications, such as by implementing and using APIs, for example.

Figure 4B:
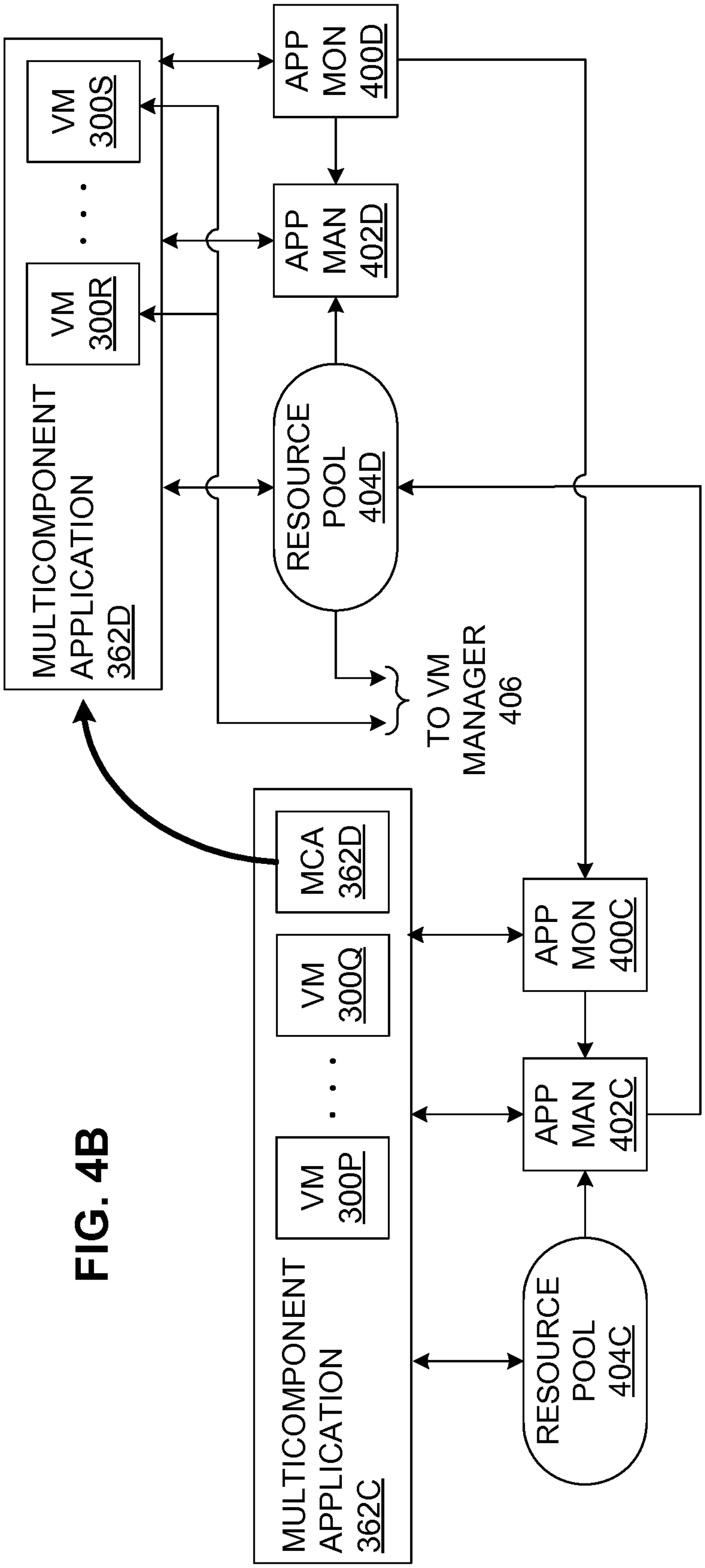
FIG. 4B illustrates a recursive aspect of some embodiments of the invention, enabling the use of nested multicomponent software applications.

FIG. 4B illustrates a recursive aspect of some embodiments of the invention, which enables the use of nested multicomponent software applications, as described below. FIG. 4B shows a first multicomponent software application 362C, along with a subset of the functional units that may support the operation of the multicomponent application 362C in a general implementation of the invention, such as the implementation illustrated in FIG. 4A.

The multicomponent software application 362C may be substantially the same as the multicomponent software applications 362A and 362B, except as described herein, or it may be substantially different. The multicomponent application 362C comprises a plurality of VMs, including a VM 300P and a VM 300Q, with a software component executing in each VM. Each of the VMs 300P and 300Q may be substantially the same as the VMs 300H, 300I, 300J and 300K, or they may be substantially different. Thus, each of the VMs 300P and 300Q may comprise virtual system hardware, such as the virtual system hardware 302F; a guest OS, such as the guest OS 352F; and a software component, such as the software component 364F.

As further illustrated in FIG. 4B, the multicomponent application 362C also includes a second, nested multicomponent software application 362D. The multicomponent application 362D may also be substantially the same as the multicomponent applications 362A and 362B, or it may be substantially different. The multicomponent application 362D comprises a plurality of VMs, including a VM 300R and a VM 300S, with a software component executing in each VM. Each of the VMs 300R and 300S may be substantially the same as the VMs 300H, 300I, 300J and 300K, or they may be substantially different. Thus, each of the VMs 300R and 300S may comprise virtual system hardware, such as the virtual system hardware 302F; a guest OS, such as the guest OS 352F; and a software component, such as the software component 364F.

The operation of the multicomponent application 362D within a virtual computer system may be substantially the same as the operation of other multicomponent applications described above, such as the multicomponent applications 362, 362A and 362B. Thus, for example, the software components within the plurality of VMs, including the VMs 300R and 300S, may communicate and interact with each other in a generally conventional manner for multicomponent software applications to implement the intended functionality of the multicomponent application 362D.

The operation of the multicomponent application 362C within a virtual computer system may also be substantially the same as the operation of other multicomponent applications described above, such as the multicomponent applications 362, 362A and 362B, except that the multicomponent application 362D effectively takes the place of a software component in the multicomponent application 362C. Thus, for example, the software components within the plurality of VMs in the multicomponent application 362C, including the VMs 300P and 300Q, may communicate and interact with each other in a generally conventional manner for multicomponent software applications. There may also be communications and interactions between these software components of the multicomponent application 362C and the software components of the multicomponent application 362D, however. These communications and interactions between the software components of the multicomponent application 362C on one hand and the software components of the multicomponent application 362D on the other hand may be implemented in a variety of ways. As one example, one or more software components within the multicomponent application 362C may communicate and interact directly with one or more software components within the multicomponent application 362D. As another alternative, one of the software components within the multicomponent application 362D may function as an interface component, having full responsibility for all communications and interactions between the software components of the multicomponent application 362C on one hand and the other software components of the multicomponent application 362D on the other hand. In this case, the software components of the multicomponent application 362C may generally communicate and interact with the interface software component of the multicomponent application 362D as if that interface component were just another single software component within the multicomponent application 362C. The interface software component would then be responsible for relaying communications and interactions to and from the other software components within the multicomponent application 362D.

FIG. 4B also shows a resource pool 404C, an application manager 402C and an application monitor 400C, which support the operation of the multicomponent application 362C in substantially the same way that the resource pool 404B, the application manager 402B and the application monitor 400B support the operation of the multicomponent application 362B. Similarly, FIG. 4B also shows a resource pool 404D, an application manager 402D and an application monitor 400D, which support the operation of the multicomponent application 362D in substantially the same way that the resource pool 404B, the application manager 402B and the application monitor 400B support the operation of the multicomponent application 362B. The resource pools 404C and 404D, the application managers 402C and 402D, and the application monitors 400C and 400D may be substantially the same as the resource pools 404A and 404B, the application managers 402A and 402B, and the application monitors 400A and 400B, respectively, or they may be substantially different.

The set of functional units illustrated in FIG. 4B may operate within a virtual computer system such as illustrated in FIG. 4A. In particular, the set of functional units illustrated in FIG. 4B may replace a corresponding set of functional units illustrated in FIG. 4A. For example, the multicomponent application 362C may replace the multicomponent application 362B, the resource pool 404C may replace the resource pool 404B, the application manager 402C may replace the application manager 402B and the application monitor 400C may replace the application monitor 400B. In this case, for example, the system manager 408 may allocate computing resources in the resource pool 101 to the multicomponent application 362C, in the form of the resource pool 404C; the application monitor 400C may report status and performance information related to the multicomponent application 362C to the system manager 408, as well as possibly to other functional units; and the VM manager 406 may distribute the multiple VMs in the multicomponent application 362C between the first physical computer 100E and the second physical computer 100F.

Now the application manager 402C may manage the multicomponent application 362C in substantially the same manner that the application manager 402B manages the multicomponent application 362B, for example. In particular, the application manager 402C may allocate computing resources available in the resource pool 404C between the multiple VMs that support the execution of the multicomponent application 362C, such as the VMs 300P and 300Q. In some particular embodiments, the application manager 402C also allocates a portion of the computing resources available in the resource pool 404C to the multicomponent application 362D. The computing resources allocated to the multicomponent application 362D may be viewed as the resource pool 404D. In other embodiments, the computing resources allocated to the resource pool 404D may be allocated directly from the resource pool 101 by the system manager 408. The application manager 402D may then allocate computing resources available in the resource pool 404D between the multiple VMs that support the execution of the multicomponent application 362D, such as the VMs 300R and 300S.

The application monitor 400D may monitor the status and performance of the multicomponent application 362D in substantially the same manner that the application monitor 400B monitors the status and performance of the multicomponent application 362B. The application monitor 400D may then report the results of this monitoring to the application monitor 400C. The application monitor 400C may monitor the status and performance of the software components in the multiple VMs in the multicomponent application 362C, such as the software components in the VMs 300P and 300Q, in substantially the same manner that the application monitor 400B monitors the status and performance of the software components of the multicomponent application 362B. The application monitor 400C may then report the results of this monitoring, along with the results of the monitoring performed by the application monitor 400D, to the system manager 408, for example. There are also a wide variety of other possibilities for monitoring the status and performance of the multicomponent applications 362C and 362D, and for reporting the results of this monitoring to other functional units within the virtual computer system, including other possible configurations for application monitors.

Thus, by providing an extra multicomponent software application support layer, comprising the resource pool 404D, the application manager 402D and the application monitor 400D, the multicomponent application 362D may be nested within the multicomponent application 362C. Generally, any multicomponent application may contain a nested multicomponent application, including a multicomponent application that is itself already nested within still another multicompoment application. Thus, for example, a first multicomponent application may be nested within a second multicomponent application, which may be nested within a third multicomponent application, and so on.

Figure 5:
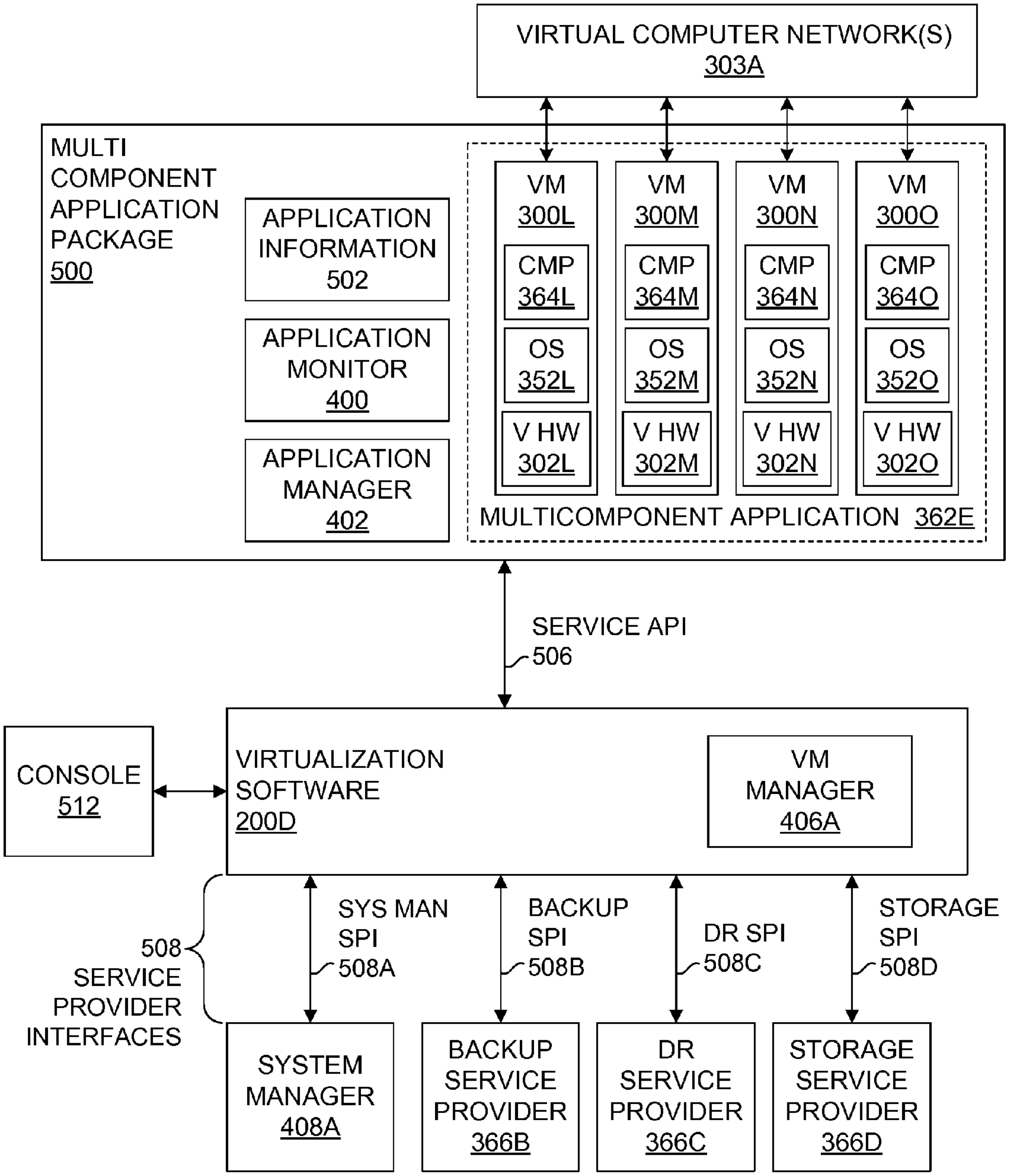
FIG. 5 illustrates one embodiment of the invention in which a virtualized computer platform is established and maintained for the execution of multicomponent software applications and other software applications.

FIG. 5 illustrates one particular embodiment of the invention for supporting the execution of one or more multicomponent software applications, possibly along with one or more conventional software applications. The description of the invention provided above, in connection with FIGS. 3, 4A and 4B, may generally also be applied to the embodiment of FIG. 5.

Virtualization software 200D establishes and maintains a virtualized computer platform on a set of one or more physical computers (not shown for simplicity) that can support the operation of one or more multicomponent software applications, along with one or more conventional software applications, executing within multiple VMs, generally as described above. The virtualization software 200D virtualizes computing resources of the underlying physical computer(s) and provides these virtualized computing resources for the execution of the VMs. The virtualization software 200D may be substantially the same as the virtualization software 200C of FIG. 3, except as described below, or the virtualization software 200D may be substantially different. Existing products of the assignee of this patent, such as the VMware ESX Server virtualization product and the VMware VirtualCenter virtual infrastructure management software, may be modified to implement the virtualization software 200D.

The virtualization software 200D includes a VM manager 406A, which may be substantially the same as the VM manager 406 of FIG. 4A, or it may be substantially different. The virtualization software 200D also implements an interface to a console 512, which may be used by a system administrator to monitor and control the operation of the virtualization software 200D. Through the virtualization software 200D, the console 512 may also be used to monitor and control the operation of other software components illustrated in FIG. 5.

The virtualization software 200D supports the execution of a multicomponent software application using multiple VMs, with separate components of the application executing in different VMs, generally as described above. FIG. 5 shows such a multicomponent software application 362E implemented within a multicomponent software application package 500.

In this particular example, the multicomponent application package 500 includes a plurality of VMs, such as a first VM 300L, a second VM 300M, a third VM 300N and a fourth VM 300O. The VMs 300L, 300M, 300N and 300O may be substantially the same as the VMs described above, such as the VM300F of FIG. 3, or they may be substantially different. Thus, the VM 300L has a virtual system hardware 302L, the VM 300M has a virtual system hardware 302M, the VM 300N has a virtual system hardware 302N and the VM 300O has a virtual system hardware 302O, each of which may be substantially the same as the virtual system hardware 302F, or each of which may be substantially different; the VM 300L has a guest OS 352L, the VM 300M has a guest OS 352M, the VM 300N has a guest OS 352N and the VM 300O has a guest OS 352O, each of which may be substantially the same as the guest OS 352F, or each of which may be substantially different; and the VM 300L has a software component 364L, the VM 300M has a software component 364M, the VM 300N has a software component 364N and the VM 300O has a software component 364O, each of which may be substantially the same as the software component 364F, or each of which may be substantially different.

The software components 364L, 364M, 364N and 364O combine to form the multicomponent software application 362E, generally as described above for other multicomponent software applications, such as the multicomponent software application 362 of FIG. 3. The multicomponent software application 362E is shown with a dashed line in FIG. 5 because it is not a distinct software component within the multicomponent application package 500. The VMs 300L, 300M, 300N and 300O may be interconnected by one or more virtual computer networks 303A, as illustrated in FIG. 5. The virtual computer network(s) 303A may be substantially the same as the virtual computer network(s) 303 of FIG. 3, or they may be substantially different.

As also illustrated in FIG. 5, the multicomponent application package 500 also includes an application monitor 400 and an application manager 402. The application monitor 400 may be substantially the same as the application monitors 400A, 400B, 400C and 400D described above, or it may be substantially different; and the application manager 402 may be substantially the same as the application managers 402A, 402B, 402C and 402D described above, or it may be substantially different.

As also illustrated in FIG. 5, the multicomponent application package 500 also includes some application information 502. This application information 502 may take any of a variety of forms, including possibly a simple text file. The application information 502 may include a variety of information related to the multicomponent software application 362E, including information about high-level management operations such as starting up the multicomponent software application, operating the multicomponent software application, and shutting down the multicomponent software application. The application information 502 may include the types of information described above, such as the resource information provided to the system manager 408, which is provided to a system manager 408A in FIG. 5, which is described below; resource and provisioning information provided to the application managers 402A and 402B, which is provided to the application manager 402 in FIG. 5; status and performance monitoring information provided to the application monitors 400A and 400B, which is provided to the application monitor 400 in FIG. 5; and availability information provided to the VM manager 406, which is provided to the VM manager 406A in FIG. 5. The application information 502 may also include information that is useful to other external service providers, such as a backup service provider. The application information 502 may also include information about the number of permitted users, an expiration date, scaling factors and billing information, along with other possible types of information.

As indicated above, the application information 502 may be contained in a separate text file, or in some other separate computer readable file. The application information 502 may also be downloaded (or updated) from a remote location when the multicomponent application 362E is installed, in a well known manner. As another alternative, the application information 502 may be built into one or more software modules that implement the application manager 402 and/or the application monitor 400. As yet another alternative, the application information 502 that is to be used by the application manager 402 may be built into one or more software modules that implement the application manager 402, the application information 502 that is to be used by the application monitor 400 may be built into one or more software modules that implement the application monitor 400, and the application information 502 that is to be used by other functional units, such as the system manager 408A and/or the VM manager 406A may be contained in a separate computer readable file, for example. A wide variety of other possibilities may also be implemented.

The multicomponent application package 500 may be implemented as a single installation package. For example, the entire contents of the application package 500 may be sold as a single unit and distributed on a single DVD disc, on multiple CD discs or on some other arrangement of these or other storage media. The application package 500 may also be downloaded as a single unit from a server computer over the Internet or over some other network connection. Various other possibilities may also exist or be developed for the distribution of the multicomponent application package 500.

The specific configuration of the multicomponent application package 500 and the process that is used to install the components of the package onto a virtual computer system may vary widely in different implementations and/or for different multicomponent software applications. In an installation package, the VMs 300L, 300M, 300N and 300O may be implemented as VM templates, as described above, with each VM template containing an entire software stack for one of the components of the multicomponent software application 362E. As described above, each software stack in the different VM templates may be optimized for the particular software component, with a desired patch level and possibly a hardening of the software stack. These VM templates may be used to install the multicomponent software application 362E, with one or more instances of each of the required components, on the virtualized computer platform supported by the virtualization software 200D. The application monitor 400 and the application manager 402 may also be installed in the virtual computer system. Also, the application information 502 may be consulted and/or distributed to one or more software components within the virtual computer system. The configuration of the application monitor 400 and the application manager 402, in particular, may vary in different implementations and/or for different multicomponent software applications. Also, the order in which components from the installation package are installed, the manner in which the components are installed, and the functional units that are responsible for installation of different components may also vary, depending on the implementation and/or the multicomponent software application.

First, the application monitor 400 and the application manager 402 may be implemented in a variety of ways. As one example, they may be implemented as stand-alone software components that are installed into the virtualization software 200D, just like the loadable modules and drivers 210B are installed into the kernel 202B of FIG. 2. As another example, the application monitor 400 and the application manager 402 may be implemented within virtual machines, which are loaded on top of the virtualized computer platform, just like the VMs 300L, 300M, 300N and 300O. In fact, in some embodiments, the application monitor 400 and the application manager 402 may actually be embedded in one or more of the same VMs that also contain a component of the multicomponent software application, such as the VMs 300L, 300M, 300N and 300O.

The virtualization software 200D may be responsible for installing at least a first component from the installation package onto the virtual computer system, in the form of a loadable module within the virtualization software 200D, in the form of a VM on top of the virtualized computer platform, or in some other form. For example, the virtualization software 200D may first install the application manager 402, either as a separate loadable module or within a VM. The virtualization software 200D may then continue to install the remaining components from the installation package, or the application manager 402 may take over the installation process and install the remaining components.

The process for installing the components from the installation package may vary for different implementations or it may vary within a single implementation, for different multicomponent software applications. In this latter case, the application information 502 may include information indicating how the components from the installation package are to be installed, and it may also include information indicating which functional units are to install different components from within the installation package. For example, the application information 502 may indicate that the virtualization software 200D is to install the application manager 402; it may indicate whether the application manager 402 is a separate loadable module or whether it is included in a VM, for example; and it may indicate that the application manager 402 is to install the remainder of the components in the installation package. The application manager 402 may then install the remainder of the components, possibly after retrieving additional installation information from the application information 502, and possibly after receiving information from or through the virtualization software 200D, such as information indicating the computing resources that have been allocated to the multicomponent application 362E by the system manager 408A.

As illustrated in FIG. 5, for that particular embodiment, the virtualization software 200D also implements a service API 506 between the virtualization software 200D and the multicomponent application package 500. The service API 506 may be a generally conventional API, which enables software components within the multicomponent application package 500 to communicate with and interact with the virtualization software 200D in a generally conventional manner. For example, the application monitor 400 and the application manager 402 may communicate with and interact with the virtualization software 200D using the service API 506. If however, the application monitor 400 and/or the application manager 402 are implemented as modules loaded into the virtualization software 200D, there may not be a need for these components to use the service API 506. The software components 364L, 364M, 364N and 364O of the multicomponent software application 362E may also use the service API 506 to communicate with and interact with the virtualization software 200D. It's also possible to provide functions within the service API 506 that may be used by other software within the VMs 300L, 300M, 300N and 300O, such as the guest OSs 352L, 352M, 352N and 352O. In this case, the virtualization support provided to the VMs 300L, 300M, 300N and 300O may be considered a form of "paravirtualization." Also, software components within the application package 500 may use the service API 506 to communicate with and interact with other software components that interface directly or indirectly with the virtualization software 200D, with the virtualization software 200D acting as an intermediary. For example, software components within the application package 500 may use the service API 506 to communicate with and interact with the system manager 408A, in particular.

The virtualization software 200D may also enable multiple software units executing in different VMs on the virtualized computer platform to communicate with one another through the service API 506. Thus, a first software unit executing within a first VM may send a message to the virtualization software 200D over the service API 506, but this message may be intended for a second software unit executing within a second VM. The virtualization software 200D may receive the message, determine its intended recipient, and forward the message to the second software unit within the second VM, again using the service API 506. An addressing mechanism may even be implemented to facilitate communications between a large number of software units executing in different VMs on the virtualized computer platform. These software units that may communicate with each other may be any type of software unit executing within the VMs, including components within one or more multicomponent software application, application managers, application monitors, guest OSs, conventional guest applications and other possible software units. Also, one software unit may be able to communicate with another software unit that is in a different VM, but within the same multicomponent software application; a software unit may be able to communicate with another software unit that is in a different multicomponent application altogether; or a software unit may be able to communicate with another software unit that is not in any multicomponent application, such as a software unit that is in a conventional application executing in a stand alone VM.

In some embodiments, in particular, the multiple components in a multicomponent software application may automatically be able to communicate with one another upon installation, through this communication link using the service API 506. Thus, for example, the components in the multicomponent application package 500 may effectively have a built-in message bus linking all of the components together. The application manager 402 and the application monitor 400 may also be effectively connected to this message bus, so that they can communicate with each other, and with each of the components in the multicomponent application 362E. Providing such a communication bus between different software units within a multicomponent application can be beneficial in a variety of ways. As just one example, the application monitor 400 may use this communication bus to gather health and performance data from the components in the multicomponent application 362E.

The virtualization software 200D also implements an interface to the system manager 408A. The system manager 408A may be substantially the same as the system manager 408 of FIG. 4A, or it may be substantially different. In particular, the system manager 408A may be derived from existing products and technologies, such as the Enterprise Workload Manager (eWLM) from International Business Machines Corporation (IBM), or the System Definition Model (SDM) from Microsoft Corporation, which is part of its Dynamic Systems Initiative (DSI). The interface between the virtualization software 200D and the system manager 408A may take the form of a service provider interface (SPI) 508. As described above in connection with FIG. 3, a SPI is generally an API between virtualization software and an external service provider. Such an SPI enables the virtualization software to communicate with and interact with the external service provider, so that the external service provider may provide one or more services to a multicomponent software application, or other software application, through the virtualization software. In this particular case, a system manager SPI 508A is implemented between the virtualization software 200D and the system manager 408A. The system manager SPI 508A, in this particular embodiment, is designed for use by system managers in general, such as by different system managers from different vendors, but it is not designed for use by other external service providers, other than system managers.

The application monitor 400, the application manager 402, the VM manager 406A and the system manager 408A may operate in substantially the same manner as the application monitor 400A, the application manager 402A, the VM manager 406 and the system manager 408, respectively, to support the operation of the multicomponent application 362E, or they may operate in a substantially different manner. These functional units may provide certain services to the multicomponent application 362E, such as automated provisioning of new VMs containing new instances of software components, resource allocation, VM distribution, performance monitoring, resource management, and high availability, in the same general manner as described above in connection with FIG. 4A for the application monitors 400A and 400B, the application managers 402A and 402B, the VM manager 406 and the system manager 408.

The implementation of the functional units described above, specifically the system manager 408A, the application manager 402, the VM manager 406A and the application monitor 400, may vary considerably depending on the interfaces provided between these different functional units, and depending on the interfaces provided between these functional units and other software within the virtualization software 200D. For example, suppose that the application manager 402 and the application monitor 400 are implemented together within one of the VMs in the multicomponent application package 500, such as the VM 300L. Suppose further, as illustrated in FIG. 5, that the application manager 402 and the application monitor 400 interface with the virtualization software 200D using the service API 506, and that the system manager 408A interfaces with the virtualization software 200D using the system manager SPI 508A. Now consider some of the functionality described above for these functional units.

The virtualization software 200D may notify the system manager 408A, using the system manager SPI 508A, of what computing resources are available in the system resource pool, such as the resource pool 101 of FIG. 4A. The system manager 408A may then allocate computing resources from this system resource pool to the multicomponent application 362E, as well as to any other multicomponent applications running on the virtualized computer platform and to any other VMs, not associated with a multicomponent application, running on the virtualized computer platform. Thus, the system manager 408A effectively establishes a separate resource pool for the multicomponent application 362E, in the same general manner that the system manager 408 effectively establishes the resource pool 404A for the multicomponent application 362A in FIG. 4A. The system manager 408A may communicate the allocation of these computing resources to the multicomponent application 362E to the virtualization software 200D using the system manager SPI 508A.

Now the application manager 402 may use the service API 506, from within the VM 300L, to determine, from the virtualization software 200D, what computing resources have been allocated to the resource pool for the multicomponent application 362E. Based on this resource allocation information and based on application information 502 about the multicomponent application 362E, the application manager 402 may then determine an appropriate set of components for the multicomponent application 362E, and the application manager 402 may initiate execution of a set of VMs that contain this appropriate set of components. The service API 506 may also provide a function that enables the application manager 402 (and/or other software modules running on the virtualized computer platform) to initiate execution of a new VM. In response to a call to this function, the virtualization software 200D may make a copy of the files that define the VM that is to be initiated, and the virtualization software 200D may then cause the new VM to begin executing. In particular, the VM manager 406A may participate in responding to a call to this function, so that the VM manager 406A can cause the new VM to begin executing on a particular physical computer, in accordance with the VM manager's determination of an effective distribution of VMs between the physical computers of the virtual computer system.

Also, the application monitor 400 may monitor the performance of the multicomponent application 362E relative to performance objectives that have been established for the multicomponent application 362E. The application manager 402 may obtain performance information directly from the application monitor 400, as both of these functional units operate within the same VM 300L. The application monitor 400 may also report performance information to the virtualization software 200D using the service API 506, and some of this performance information may be conveyed to the system manager 408A using the system manager SPI 508A. The system manager 408A and the application manager 402 may respond to this performance information in a variety of ways, such as, as described above, by adjusting the computing resources that are allocated to the multicomponent application 362E overall, and/or by adjusting the computing resources that are allocated to individual components of the multicomponent application 362E.

From this description, a person of skill in the art will understand a variety of other communications, interactions and functions that may be performed by these functional units in the configuration of FIG. 5. At the same time, however, a person of skill in the art will also understand that there are a wide variety of other possibilities for implementing all the functions described above, with a variety of different software configurations and a variety of different interface configurations.

FIG. 5 also shows additional SPIs 508, namely a backup SPI 508B, a disaster recovery SPI 508C and a storage SPI 508D. The backup SPI 508B provides an interface between the virtualization software 200D and an external backup service provider 366B, which enables efficient and effective backups of the data of the multicomponent software application 362E. The disaster recovery SPI 508C provides an interface between the virtualization software 200D and an external disaster recovery service provider 366C, which may enable the multicomponent software application 362E to continue operating during, or promptly resume operation after, a disaster strikes the organization operating the virtual computer system. The storage SPI 508D provides an interface between the virtualization software 200D and an external storage service provider 366D, which enables efficient and effective storage and retrieval of operational data of the multicomponent software application 362E. Various other SPIs 508 are also possible.

As an alternative to using a SPI 508, an external service provider may alternatively be installed within one or more VMs on the virtualized computer platform, and use the service API 506 to interface with the virtualization software 200D, to provide one or more services to multicomponent and/or conventional applications running within VMs on the virtualized computer platform. In this case, the service API 506 may be designed to provide the same interface capabilities to the external service provider as would otherwise be provided by the corresponding SPI 508. Thus, an external service provider may be implemented as a conventional software application within a stand alone VM on the virtualized computer platform, or as a multicomponent application running in a set of VMs on the virtualized computer platform, for example. In either case, the external service provider can still provide one or more services to other multicomponent or conventional applications running on the virtualized computer platform, but using the service API 506, instead of a separate SPI 508.

The recursive aspect of some embodiments of the invention, illustrated in FIG. 4B and described above, may also be applied to the implementation illustrated in FIG. 5. Thus, for example, a multicomponent application package may contain another multicomponent application package nested within it. As an example, the component 364O in the VM 300O in the multicomponent application package 500 may be replaced with a nested multicomponent application package. In this case, the multicomponent application package 500 may generally be installed in any of a variety of ways, as described above. When the installation process gets to the VM 300O, the nested multicomponent application package may then be installed, also in any of a variety of ways. Other aspects of the invention may also be applied in conjunction with this recursive aspect of the invention. For example, the ability of multiple software units executing in different VMs on the virtualized computer platform to communicate with one another through the service API 506 may also be applied in conjunction with the recursive aspect of the invention. Thus, for example, multiple software units within a single nested multicomponent application running on the virtualized computer platform may communicate with each other by this means; and a software unit within a nested multicomponent application may also communicate using this means with other software units that are not within the nested multicomponent application.

The software and interface configuration of FIG. 5 may be advantageous in some virtual computer systems for a variety of reasons. First, the developer of the multicomponent software application 362E may have a large role in determining the support that is provided to its multicomponent application when operating on the virtualized computer platform, even if a different vendor develops the virtualization software 200D. The developer of the virtualization software 200D may specify the service API 506 and an application package format for the multicomponent application package 500, and then leave it to application developers to develop and specify everything within the multicomponent application package 500. Thus, the developer of the multicomponent application 362E may also develop the application manager 402 and the application monitor 400, and this developer may also specify the application information 502. This developer may be able to design the multicomponent application package 500 to provide better support for the multicomponent application 362E because this developer generally has the best knowledge of a variety of factors related to the operation of the multicomponent application. For example, the developer is generally best able to determine an appropriate set of components for the multicomponent application 362E, based on the computing resources allocated to the multicomponent application. The developer may incorporate this knowledge into the application manager 402 during the development of the software for that functional unit. Then, when the multicomponent application 362E is installed to operate on the virtualized computer platform, the application manager 402 is able to put this knowledge to work in support of the multicomponent application 362E. Thus, the application manager 402 developed by the developer of the multicomponent application 362E may provide better support for the multicomponent application 362E than might be provided using an application manager developed by the vendor of the virtualization software 200D.

In a similar manner, enabling the developer of the multicomponent application 362E to develop the application monitor 400 may provide more effective monitoring of the performance of the multicomponent application 362E than might be provided by an application monitor developed by a different vendor that doesn't have such detailed knowledge of the multicomponent application 362E. Similarly, the application information 502 may be better tailored to the needs of the multicomponent application 362E by the developer of that application, so that even the system manager 408A and the VM manager 406A, which may be developed by other developers, may provide better support to the multicomponent application 362E than if the application information 502 is specified by someone other than the developer of the multicomponent application 362E. Thus, the developer of the multicomponent software application 362E may develop/specify everything within the multicomponent application package 500. This developer may sell and distribute the application package 500 as a single unit. In this manner, a purchaser of the application package 500 gets not only the multicomponent application 362E, but also the other software and information that provides customized support for the multicomponent application on the virtualized computer platform. The virtualization software 200D is able to provide customized support for the multicomponent software application 362E through the relatively simple installation of the multicomponent application package 500.

Other possible advantages to the software and interface configuration of FIG. 5 relate to providing the SPIs 508. Various software developers can develop a variety of external service providers, which can then support the execution of multicomponent applications through the virtualization software 200D and the SPIs 508. An organization that is running the virtual computer system may choose between different vendors for each type of external service provider.

Another possible advantage of the configuration of FIG. 5 is that it can provide a standardized and system independent way of packaging up configuration and installation knowledge related to a multicomponent software application. The application package 500 contains preconfigured and optimized software stacks for each component and built-in knowledge on how to scale and monitor the application.

Other possible advantages result, not only from the more specific configuration of FIG. 5, but also from the more general implementations illustrated in FIGS. 4A and 4B. For example, the operation of the system manager 408 and the VM manager 406 can provide uniform services across multiple multicomponent software applications from different vendors, including consistent high availability requirements and consistent service level objectives.

Another possible advantage of both the specific and more general implementations relates to an ability to decouple the monitoring of the health of the multicomponent application from the monitoring of the health of the physical hardware. The health of the physical hardware is monitored and maintained by the virtualization software, and the virtualization software provides virtualized computing resources to the multicomponent applications generally independent of the health of the physical hardware. The application monitors then use these virtualized computing resources and built-in knowledge of health and performance metrics for the respective multicomponent applications to monitor the health of the multicomponent applications independent of the health of the physical hardware.

What is claimed is:

1. A method for supporting the execution of a multicomponent software application (MCSA) in a virtual computer system, the method comprising:

obtaining information about the MCSA, the information including resource requirements of individual components of the MCSA and performance objectives of at least some of the individual components;

obtaining information about computing resources of multiple virtual machines (VMs) in the virtual computer system;

using computer software to determine an allocation of the computing resources among the multiple VMs in which the multiple components of the MCSA are to execute, the determination of the allocation being based on the information about the MCSA and the information about the computing resources of the VMs;

monitoring performance of the MCSA during execution of the multiple components, the monitoring being specific to the performance objectives of at least some of the individual components of the MCSA;

using computer software to automatically adjust the allocation of the MCSA computing resources among the VMs in which the components of the MCSA execute based on the monitoring that is specific to the performance objectives of at least some of the individual components;

determining if additional physical resources have been added to the virtual computer system; and in response to additional physical resources being added to the virtual computer system, using computer software to automatically adjust allocation of the additional physical resources among the VMs in which components of the MCSA execute;

wherein automatically adjusting the allocation is implemented without migrating any VM from the physical computer on which the VM executes; and wherein the MCSA comprises a first set of components and a nested MCSA, the first set of components executing on a first set of VMs, the nested MCSA comprising a second set of components executing on a second set of VMs, wherein automatically adjusting the allocation comprises modifying a first resource pool associated with the MCSA and modifying a second resource pool within the first resource pool and associated with the second set of VMs, based on the modification to the first resource pool.

2. The method of claim 1 wherein the MCSA is a multitier application in which at least some of the components are functionally different from but operationally coordinated with other of the components of the MCSA.

3. The method of claim 1 wherein the automatic adjusting further relates to an amount of computing resources allocated to the MCSA.

4. The method of claim 3 wherein the amount of computing resources allocated to the MCSA is adjusted automatically using computer software in response to observations related to the amount of computing resources available within the virtual computer system.

5. The method of claim 4 wherein the computing resources which are automatically adjusted based on the monitoring comprise processor cycles and system memory.

6. The method of claim 1 further comprising, in response to an observation related to the performance of the MCSA within the virtual computer system, using computer software to automatically start an additional VM containing an additional functioning instance of one of the components of the MCSA.

7. The method of claim 1 further comprising, in response to an observation related to the performance of the MCSA within the virtual computer system, using computer software to automatically terminate a VM containing an instance of a particular component of the MCSA.

8. The method of claim 1 further comprising using computer software to automatically distribute the multiple VMs in which the multiple components of the MCSA execute between multiple physical computers over which a virtualized computer platform spans.

9. The method of claim 8 further comprising obtaining availability information regarding steps that can be taken to increase the availability of the MCSA, and using the availability information as a basis when automatically distributing the multiple VMs between the multiple physical computers.

10. The method of claim 1 wherein an additional VM containing an additional functioning instance of one of the components of the MCSA is automatically started if needed to take advantage of the additional physical resources added to the virtual computer system.

11. The method of claim 1, wherein automatically adjusting the allocation comprises modifying the resource pool in accordance with an allocation policy that specifies satisfying resource needs for each resource pool associated with VMs in which components of the MCSA execute before satisfying resource preferences for the resource pools.

12. A computer program embodied in a non-transitory computer readable medium, the computer program being executable in a virtual computer system in which multiple components of a multicomponent software application (MCSA) execute in multiple virtual machines (VMs), wherein computing resources are allocated to the MCSA to establish MCSA computing resources, the computer program comprising:

instructions for determining an allocation of the MCSA computing resources among the multiple VMs in which the multiple components of the MCSA execute, the determination of the allocation being based on information about resource requirements and performance objectives of individual components of the MCSA and based on resources of the individual VMs;

instructions for monitoring overall performance of the MCSA to determine whether the operation of the MCSA satisfies performance objectives; and instructions for, based on observations related to the performance of the MCSA within the virtual computer system, automatically adjusting the allocation of the MCSA computing resources between the VMs in which the components of the MCSA execute, including adjusting the allocation based specifically upon satisfying the performance objectives for the MCSA, wherein adjusting the allocation includes reallocating at least one of processor cycles and system memory between the VMs;

instructions for determining if additional physical resources have been added to the virtual computer system; and instructions for, in response to additional physical resources being added to the virtual computer system, automatically adjusting allocation of the additional physical resources among the VMs in which components of the MCSA execute;

wherein automatically adjusting the allocation is implemented without migrating any VM from the physical computer on which the VM executes; and wherein the MCSA comprises a first set of components and a nested MCSA, the first set of components executing on a first set of VMs, the nested MCSA comprising a second set of components executing on a second set of VMs, wherein automatically adjusting the allocation comprises modifying a first resource pool associated with the MCSA and modifying a second resource pool within the first resource pool and associated with the second set of VMs, based on the modification to the first resource pool.

13. The computer program of claim 12 wherein the observations relate to an amount of computing resources allocated to the MCSA.

14. The computer program of claim 13 further comprising instructions for automatically adjusting the amount of computing resources allocated to the MCSA, in response to observations related to the amount of computing resources available within the virtual computer system.

15. The computer program of claim 12 further comprising instructions for automatically starting an additional VM containing an additional instance of a component of the MCSA, in response to an observation related to the operation of the MCSA within the virtual computer system.

16. The computer program of claim 12 further comprising instructions for automatically terminating a VM containing an instance of a component of the MCSA, in response to an observation related to the operation of the MCSA within the virtual computer system.

17. The computer program of claim 12 further comprising instructions for automatically distributing the multiple VMs in which the multiple components of the MCSA execute between multiple physical computers over which a virtualized computer platform spans.

18. The computer program of claim 12 further comprising instructions for automatically starting an additional VM containing an additional functioning instance of one of the components of the MCSA if needed to take advantage of the additional physical resources added to the virtual computer system.

19. The computer program of claim 12, wherein automatically adjusting the allocation comprises modifying the resource pool in accordance with an allocation policy that specifies satisfying resource needs for each resource pool associated with VMs in which components of the MCSA execute before satisfying resource preferences for the resource pools.

* * * * *